US010291419B2

(12) United States Patent
Jose et al.

(10) Patent No.: US 10,291,419 B2
(45) Date of Patent: May 14, 2019

(54) LOCATION AND RANGE DETERMINATION USING BROADCAST MESSAGES

(71) Applicant: QUALCOMM Incorporated, San Diego, CA (US)

(72) Inventors: Jubin Jose, Bound Brook, NJ (US); Urs Niesen, Summit, NJ (US); Venkatesan Nallampatti Ekambaram, Somerville, NJ (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 14/848,160

(22) Filed: Sep. 8, 2015

(65) Prior Publication Data

US 2016/0277197 A1 Sep. 22, 2016

Related U.S. Application Data

(60) Provisional application No. 62/133,843, filed on Mar. 16, 2015.

(51) Int. Cl.
 *H04L 12/18* (2006.01)
 *H04W 64/00* (2009.01)
 (Continued)

(52) U.S. Cl.
 CPC ............ *H04L 12/18* (2013.01); *G01S 5/0063* (2013.01); *G01S 5/02* (2013.01); *H04W 64/00* (2013.01)

(58) Field of Classification Search
 None
 See application file for complete search history.

(56) References Cited

U.S. PATENT DOCUMENTS 8,463,290 B2 * 6/2013 Rhoads .................... G08G 1/08
 455/421
9,696,431 B2 * 7/2017 Wirola .................. G01S 5/0289
 (Continued)

FOREIGN PATENT DOCUMENTS

GB 2394628 A 4/2004
WO 2011149496 A1 12/2011

OTHER PUBLICATIONS

Second Written Opinion from International Application No. PCT/US2016/018178—European Patent Office—Munich, Germany—dated Feb. 21, 2017—6 pgs.
(Continued)

*Primary Examiner* — Kevin C. Harper
*Assistant Examiner* — Derrick V Rose
(74) *Attorney, Agent, or Firm* — Hunter Clark PLLC

(57) ABSTRACT

Disclosed are implementations that include a method, at a mobile device, including receiving multiple broadcast messages transmitted by multiple stationary wireless devices, and obtaining first information relating to each of the multiple broadcast messages, with at least some of the first information being included in the multiple broadcast messages, and second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages. The method also include determining location information for the mobile device based on the first information, the second information, and known positions of at least some of the multiple stationary wireless devices.

29 Claims, 11 Drawing Sheets

(51) Int. Cl.
*G01S 5/00* (2006.01)
*G01S 5/02* (2010.01)

(56) References Cited

U.S. PATENT DOCUMENTS

| | | | |
|---|---|---|---|
| 2005/0002481 A1 | 1/2005 | Woo et al. | |
| 2007/0063896 A1* | 3/2007 | Alban | G01S 19/04 342/458 |
| 2008/0146262 A1 | 6/2008 | Schwoerer et al. | |
| 2010/0146319 A1* | 6/2010 | Lundqvist | H02H 1/0061 713/400 |
| 2011/0128947 A1 | 6/2011 | Liu et al. | |
| 2011/0206020 A1 | 8/2011 | Hollick et al. | |
| 2011/0249688 A1* | 10/2011 | Liu | H04W 56/002 370/503 |
| 2012/0052884 A1* | 3/2012 | Bogatin | G01S 5/0284 455/456.6 |
| 2012/0215939 A1* | 8/2012 | Lu | H03M 7/3068 709/247 |
| 2012/0314587 A1 | 12/2012 | Curticapean | |
| 2013/0148514 A1 | 6/2013 | Zhang et al. | |
| 2013/0294266 A1 | 11/2013 | Lim et al. | |
| 2014/0187259 A1* | 7/2014 | Kakani | H04W 64/00 455/456.1 |
| 2014/0266907 A1 | 9/2014 | Taylor, Jr. et al. | |
| 2014/0295877 A1 | 10/2014 | Hart | |
| 2014/0335885 A1 | 11/2014 | Steiner et al. | |
| 2015/0181553 A1* | 6/2015 | Segev | H04W 64/00 455/456.1 |
| 2016/0277196 A1 | 9/2016 | Jose et al. | |
| 2016/0282447 A1 | 9/2016 | Amizur et al. | |

OTHER PUBLICATIONS

Second Written Opinion from International Application No. PCT/US2016/018187—European Patent Office—Munich, Germany—dated Mar. 2, 2017—6 pgs.

International Search Report and Written Opinion—PCT/US2016/018187—ISA/EPO—dated Jun. 9, 2016—10 pgs.

International Search Report and Written Opinion—PCT/US2016/018178—ISA/EPO—dated Jun. 14, 2016—11 pgs.

* cited by examiner

LOCATION AND RANGE DETERMINATION USING BROADCAST MESSAGES

CLAIM OF PRIORITY UNDER 35 U.S.C. § 119

The present application claims the benefit of and priority to U.S. Provisional Application Ser. No. 62/133,843, entitled "SCALABLE RANGING WITH BROADCAST MESSAGES," and filed Mar. 16, 2015, which is assigned to the assignee hereof, and expressly incorporated herein by reference.

BACKGROUND

There are various situations in which quick and efficient determination of a moving device's relative and/or absolute location is desired. For example, the location of a moving vehicle relative to other vehicles may be desired for safety reasons (e.g., to avoid vehicular collisions). Additionally, absolute location of a device may be desired to facilitate navigation functionalities.

SUMMARY

In some variations, an example method of estimating a location of a mobile device is provided. The method includes receiving, at the mobile device, multiple broadcast messages respectively transmitted by multiple stationary wireless devices, and obtaining, at the mobile device, first information relating to each of the multiple broadcast messages respectively received from the multiple stationary wireless devices, with at least some of the first information being included in the multiple broadcast messages respectively received from the multiple stationary wireless devices. The method also includes obtaining from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages, and determining location information for the mobile device based, at least in part, on the first information, the second information, and known positions of at least some of the multiple stationary wireless devices.

In some variations, an example mobile device is provided that includes a transceiver configured to receive multiple broadcast messages respectively transmitted by multiple stationary wireless devices. The mobile device also includes one or more processors, coupled to the transceiver, configured to obtain first information relating to each of the multiple broadcast messages respectively received from the multiple stationary wireless devices, with at least some of the first information being included in the multiple broadcast messages respectively received from the multiple stationary wireless devices, and obtain from at least one of the multiple broadcast messages second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages. The one or more processors are also configured to determine location information for the mobile device based, at least in part, on the first information, the second information, and known positions of at least some of the multiple stationary wireless devices.

In some variations, an example apparatus is provided that includes means for receiving, at a mobile device, multiple broadcast messages respectively transmitted by multiple stationary wireless devices, means for obtaining, at the mobile device, first information relating to each of the multiple broadcast messages respectively received from the multiple stationary wireless devices, with at least some of the first information being included in the multiple broadcast messages respectively received from the multiple stationary wireless devices, and means for obtaining from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages. The apparatus also includes means for determining location information for the mobile device based, at least in part, on the first information, the second information, and known positions of at least some of the multiple stationary wireless devices.

In some variations, example non-transitory computer readable media are provided. The computer readable media are programmed with instructions, executable on a processor, to receive, at a mobile device, multiple broadcast messages respectively transmitted by multiple stationary wireless devices, obtain, at the mobile device, first information relating to each of the multiple broadcast messages respectively received from the multiple stationary wireless devices, with at least some of the first information being included in the multiple broadcast messages respectively received from the multiple stationary wireless devices, and obtain from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, the second information included in the at least one of the multiple broadcast messages. The computer readable media are also programmed with instructions to determine location information for the mobile device based, at least in part, on the first information, the second information, and known positions of at least some of the multiple stationary wireless devices.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DETAILED DESCRIPTION

Figure 1:
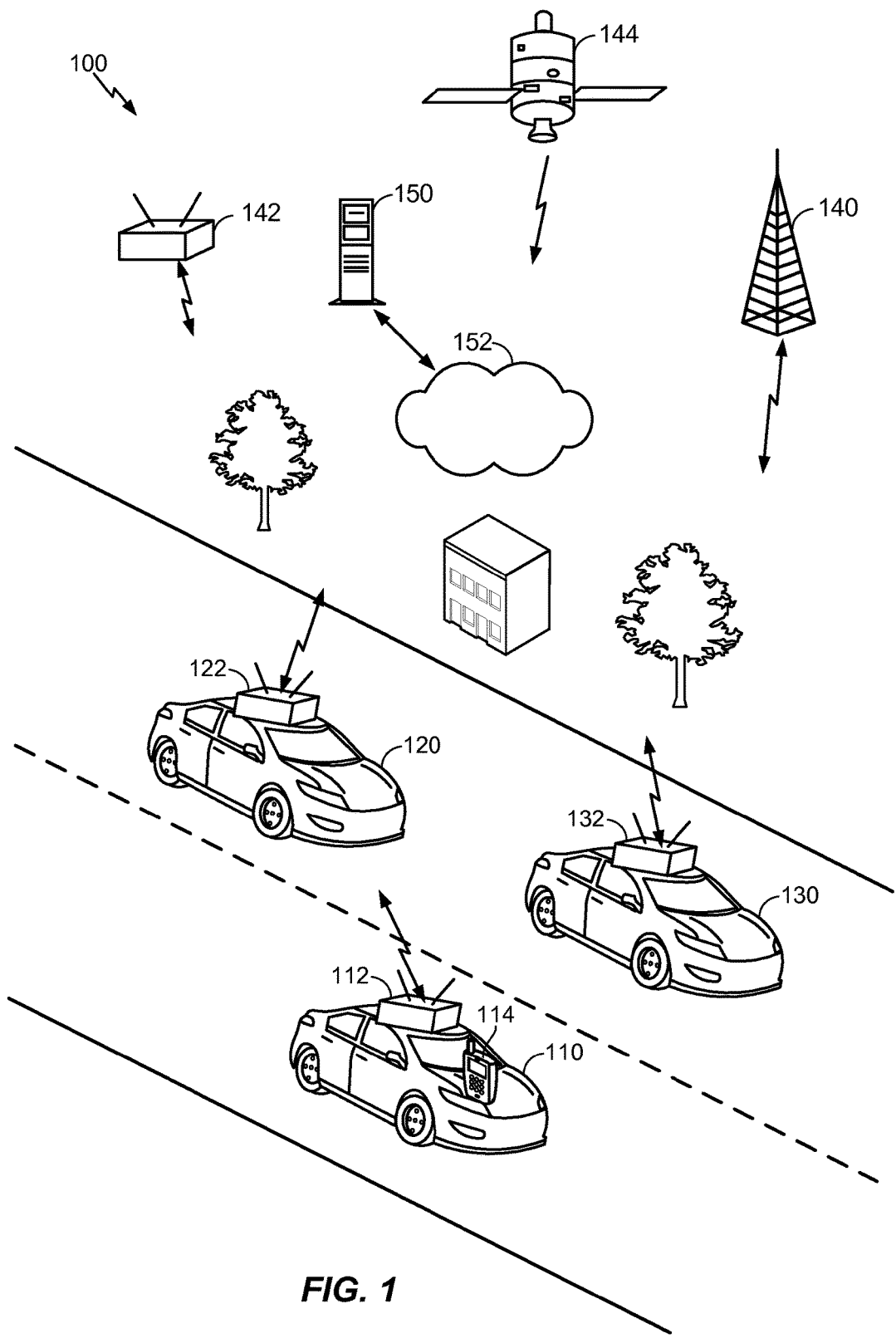
FIG. 1 is a diagram of a system, including multiple moving (non-stationary) wireless devices, to determine range and/or estimated location of the wireless devices.

Time-of-flight measurements can be used to estimate the range or distance between two wireless devices. When the clocks of the two wireless devices are not synchronous, e.g., WiFi, LTE-D without nanosecond-level synchronization, round-trip-time (RTT) message exchange may be used to remove the clock offsets and obtain the range between the two devices. A typical RTT-based ranging implementation in WiFi may involve a fine timing measurement (FTM) packet and an acknowledgement (ACK) packet.

FTM-ACK-based ranging may be extended to scenarios involving a large number of wireless devices, where each device requires range estimates to a number of devices in its vicinity. As an example, consider the vehicular dedicated short-range communication (DSRC) standard, which is a variant of WiFi. Assume there are a number N, e.g., 100, of vehicles within radio range of each other, and the goal is for each vehicle to obtain 10 range measurements per second relative to each of the other vehicles. In this scenario, each vehicle would need to communicate 10N, e.g., 1000 if N=100, FTM-ACK messages. Since DSRC operates over a 10 MHz bandwidth with relatively low spectral efficiency, communicating this number of messages in the amount of time desired may be inefficient and possibly impractical.

Disclosed herein are scalable implementations to perform ranging between wireless devices by utilizing broadcast messages, i.e., without the need for an explicit ACK (or some other type of response messaging). Hence, in embodiments involving multiple moving (non-stationary) wireless devices (e.g., installed in moving vehicles), instead of sending a message per vehicle in the vicinity, each vehicle needs to broadcast a fixed number of messages, e.g., 10. These broadcast messages could reuse existing periodic broadcast messages (example, periodic broadcast safety message (BSM) in DSRC) with additional embedded timestamps that provide timing information to determine the range between wireless devices. Thus, in the implementations described herein, the participating wireless devices perform range estimation in a scalable manner, i.e., with fixed number of messages per device.

The implementations described herein involve the transmission of periodic broadcast messages by each device. A broadcast message may, in some embodiments, have an identification (ID) corresponding to the device that broadcasts the message. This could change in a slow time scale. Each wireless device is capable of determining a time-of-departure (ToD) for its transmitted broadcast messages (typically, that ToD time is recorded but not included in the broadcast message to which that ToD corresponds), an ID, and a time-of-arrival (ToA) for received broadcast messages. Each device may include timestamps and identifiers, i.e., ToD, ID(i), ToA(i), in a following broadcast message or an additional packet. Additional information could include message IDs.

Thus, described herein are methods, systems, devices, computer readable media, and other implementations, to estimate a range between a first wireless device and a second wireless device, including a method that includes obtaining, at the first wireless device, first information (e.g., timing information, identification information) related to a first broadcast message transmitted by the first wireless device (e.g., time-of-departure of the first broadcast message, time-of-arrival of the first broadcast message at the second wireless device, etc.). The method also includes obtaining, at the first wireless device, second information related to a second broadcast message transmitted by the second wireless device (e.g., timing information, identification information to identify the wireless devices transmitting second broadcast message, etc.), with the second broadcast message comprising at least some of the first information related to the first broadcast message, and determining the range between the first wireless device and the second wireless device based, at least in part, on the first information and the second information obtained at the first wireless device. In some embodiments, the wireless devices transmitting the broadcast messages include non-stationary (i.e., moving/roaming) access points, such as WiFi access points installed in vehicles. In some embodiments, the first broadcast message, transmitted by the first wireless device, may include content comprising earlier information related to one or more earlier broadcast communications previously received by the first wireless device from one or more wireless devices. That is, in some embodiments, broadcast messages transmitted by a particular wireless device may include information (e.g., timing information, identification information) related to earlier broadcast messages, from one or more wireless devices, received by the particular wireless device. In some implementations, in order to fit as much information about earlier broadcast messages into a current broadcast message, the information to be included with the broadcast message (i.e., information about earlier/previous broadcast messages and information related to the current broadcast message) may be compressed (e.g., by truncating a portion of the most-significant bits of the data representative of the information included in the broadcast messages).

Also disclosed are methods, systems, devices, computer readable media, and other implementations, including a method to determine location information (e.g., estimate a location) for a mobile device passively receiving broadcast messages from stationary wireless devices. The method includes receiving, at the mobile device, multiple broadcast messages respectively transmitted by multiple stationary wireless devices, and obtaining, at the mobile device, first information relating to each of the multiple broadcast messages respectively received from the multiple stationary wireless devices, with at least some of the first information being included in the multiple broadcast messages respectively received from the multiple stationary wireless devices. The method further includes obtaining from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages, and determining location information for the mobile device based, at least in part, on the first information, the second information, and known positions of at least some of the multiple stationary wireless devices.

Range Determination Between Non-Stationary Wireless Devices

With reference to FIG. 1, a diagram of an example system 100 that includes multiple moving (non-stationary) wireless devices to determine range and/or estimated locations of those wireless devices (and thus determine ranges and/or locations for the objects on which the wireless devices are installed) is shown. In the illustrated example, three vehicles 110, 120 and 130 are depicted, although the systems, methods, and other implementations described herein may be used in conjunction with any number of objects (whether they are moving objects or stationary objects, or some combination thereof) and/or wireless devices. Installed (or otherwise secured or mounted) to each of the illustrated vehicles are respective wireless devices 112, 122, and 132. In some embodiments, the wireless devices 112, 122, and/or 132 may include Local Area Network Wireless Access Points (LAN-WAPs) that may be used for wireless voice and/or data communication with each other, and/or with other wireless devices (e.g., stationary access points, such as the access point 142 depicted in FIG. 1, the mobile device 114, etc.) configured for communication with the wireless devices 112, 122, and/or 132. The wireless devices 112, 122, and/or 132 may be part of a Wireless Local Area Network (WLAN), and may be further configured to enable communication operations (data and/or voice communication) over smaller geographic regions. Additionally in some embodiments, the wireless devices 112, 122, and/or 132 could also include pico or femto cells. In some embodiments, the wireless devices 112, 122, and/or 132 may be part of, for example, WiFi networks (802.11x), cellular piconets and/or femtocells, Bluetooth® wireless technology Networks, etc. As described herein, in some embodiments, implementations using 802.11 standard may provide physical layer and media access control (MAC) specifications for WLAN. In addition to the primary use of exchanging information among wireless devices, the technology may be utilized to perform ranging and/or localization through time-of-flight measurements. A variant 802.11p provides specifications for wireless access in vehicular environments. This includes data exchange between vehicles and between vehicles and infrastructure. The data exchanges could be utilized to enable ranging among vehicles and ranging and/or localization between vehicles and infrastructure.

In some embodiments, one or more of the wireless devices 112, 122, and/or 132 may be in communication with respective mobile devices that are positioned near them. As illustrated in FIG. 1, a mobile device 114 may be in communication (e.g., via near-field communication channel, a WLAN communication channel, or other types of communication link) with the wireless device 112. For example, the mobile device may be a mobile phone that is carried by a person inside the vehicle 110. As will be discussed in greater details below, in some embodiments, data available to the mobile device 114, for example GPS location determined by the mobile device 114, may be communicated to the wireless device 112 (and possibly communicated by the wireless device 112 to other wireless devices in its vicinity, such as the wireless devices 122 and 132), and may thus be used by the wireless devices of the system 100 to improve range estimate and/or to determine actual locations of the wireless devices 112, 122, and/or 132.

As further shown in FIG. 1, the system 100 may include one or more one or more different types of stationary wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, one or more Local Area Network Wireless Access Points (LAN-WAPs), such as a LAN-WAP 142, may be used to enable, for example, wireless data communication and/or wireless voice communication with the wireless devices 112, 122, 132, and/or 114. The LAN-WAP 142 may also be utilized, in some embodiments, as an independents source (possibly together with other network nodes) of position data, e.g., through implementation of multilateration-based procedures. The LAN-WAP 142 can be part of a Wireless Local Area Network (WLAN), which may operate in buildings and perform communications over smaller geographic regions than a WWAN. Additionally, in some embodiments, the LAN-WAP 142 could also be pico or femto cell that is part of a WWAN network. In some embodiments, the LAN-WAP 142 may be part of, for example, WiFi networks (802.11x), cellular piconets and/or femtocells, Bluetooth® wireless technology Networks, etc. The LAN-WAPs 142 can also form part of an indoor positioning system.

The system 100 may also be configured for in communication with one or more stationary Wide Area Network Wireless Access Points, such as a WAN-WAP 140 depicted in FIG. 1, which may be used for wireless voice and/or data communication, and may also serve as another source of independent information through which the wireless devices 112, 114, 122, and/or 132 may, for example, determine their position/location. The WAN-WAP 140 may be part of a wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 1. Typically, the WAN-WAP 140 within the WWAN may operate from fixed positions, and provide network coverage over large metropolitan and/or regional areas. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

As further shown in FIG. 1, in some embodiments, the wireless devices 112, 114, 122, and/or 132 may also be configured to at least receive information from a Satellite Positioning System (SPS) that includes a satellite 144, which may be used as an independent source of position information for the various moving wireless devices. The wireless devices configured to received and process SPS signals may thus include one or more dedicated SPS receivers specifically designed to receive signals for deriving geo-location information from the SPS satellites. Transmitted satellite signals may include, for example, signals marked with a repeating pseudo-random noise (PN) code of a set number of chips and may be located on ground based control stations, user equipment and/or space vehicles. The techniques/processes provided herein may be applied to or otherwise enabled for use in various systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The system 100 may further include a server 150 (e.g., a location server, or any other type of server) configured to communicate, via, for example, a network 152 (e.g., a cellular wireless network, a WiFi network, a packet-based private or public network, such as the public Internet), or via wireless transceivers included with the server 150, with multiple network elements or nodes, and/or mobile devices. For example, the server 150 may be configured to establish communication links with one or more of the wireless devices of FIG. 1 (e.g., with any of the devices 112, 114, 122, 132, 140, and 142), each of which may be part of the network 152, to communicate data and/or control signals to those access points, and receive data and/or control signals from the access points. In some embodiments, the server 150 may implement such protocols as Secure User plane Location (SUPL). User plane Location Protocol (ULP), LTE Positioning Protocol (LPP) and/or the LPP Extensions (LPPe) protocol for direct communication and to control and transfer measurements. The LPP protocol is defined by 3GPP, and the ULP and LPPe protocols are defined by the Open Mobile Alliance (OMA). In some embodiments, the server 150 may also be used to facilitate, at least in part, the range determination and location determination operations described herein.

As described herein, each one of the various non-stationary wireless devices 112, 122, and/or 132 (and, in some embodiments, also the mobile device 114) may be configured to communicate broadcast information that includes information (e.g., timing and/or identification information) related to a current broadcast message that a particular one of the non-stationary wireless devices is transmitting, and to further include, in the current broadcast message, information (timing and/or identification information) related to one or more earlier broadcast messages that the wireless device transmitting the current broadcast message earlier received from other wireless devices transmitting broadcast messages. A broadcast message may thus include a cumulative record of information related to previous/earlier messages (e.g., time of arrival information for the previous messages, time-of-departure of various earlier messages from the wireless devices that transmitted those earlier messages, etc.). The amount of information included in a broadcast message is constrained by available bandwidth for transmission of these broadcast messages. Therefore, to maximize the amount of information included in any given message, compression procedures may be performed on the content to be included with broadcast messages. As will further be discussed in greater details below, information related to broadcast message is collected by the various wireless devices (also referred to as wireless nodes) and used to determine ranges (distances) between the various participating wireless devices.

In some embodiments, broadcast messages transmitted from the moving wireless device may include beacon frames (e.g., control frames, each of which includes identifying and control data, that are periodically sent by the transmitting wireless devices) or data frames (e.g., frames that include encoded data, and may also include header/control information). In some embodiments, the broadcast message transmitted, for example, by the wireless devices 112, 122, and/or 132 may be periodic beacon messages formatted according to a IEEE 802.11 standard. A beacon frame formatted according to the IEEE 802.11 standard may include a median access control (MAC) header, a frame body, and a frame control sequence (FCS). The MAC header generally serves to provide basic control and/or routing information for the beacon frame, and may include a frame control (FC) field, a duration field, a destination address (DA) field (e.g., to identify a particular destination if the frame is used for a unicast transmission, or to indicate that the frame is a broadcast transmission), a source address (SA) field, a basic service set identification (BSSID) field, and a sequence control field.

The frame body is configured to provide additional control fields, as well as information elements holding non-beacon data (e.g., the information based on which ranges between wireless devices may be determined). For example, in some embodiments, the frame body may include a beacon interval field, a capability information field, a service set identifier (SSID) field, a supported rates field, a frequency-hopping (FH) parameter set field, and various other control fields. The frame body may also include information added by the transmitting wireless device such as timing information and identification information pertaining to broadcast messages from multiple wireless devices (e.g., the non-stationary devices depicted in FIG. 1) from which the ranges between those non-stationary devices may be derived. Further details regarding the data (e.g., timing information relating to broadcast messages, including timing information for previously received broadcast messages) that may be included in the information element of a broadcast message configured according to IEEE 802.11 is provided below with respect to FIG. 2.

In some embodiments, broadcast messages transmitted by the various wireless devices (e.g., the devices 112, 122, and/or 132) may be configured according to the fine time measurement (FTM) protocol. Generally, under the FTM protocol, a first, initiating, wireless device (also referred to as a "receiving STA") may obtain or compute one or more measurements of RTT based, at least in part, on timing of messages or frames transmitted between the initiating wireless device and another, second, wireless device (also referred to as a "sending STA"). In some embodiments, the initiating wireless device may initiate a message exchange transaction with the other wireless device (the "sending STA") by transmitting a fine timing measurement request (FTMR) message or frame (also referred to as a "Request") to the other wireless device. The initiating wireless device may subsequently receive an action frame or an acknowledgement message (also referred to as "Ack") that is transmitted from the other wireless device in response to the Request. In some embodiments, each of the wireless devices may be configured to periodically send broadcast FTM request messages that are intended to multiple other wireless devices in the vicinity of the requesting wireless device. Alternatively and/or additionally, in some embodiments, a device configured to transmit messages according to the FTM protocol may be configured to send, during a particular time interval, multiple FTM protocol messages to separate respective multiple target devices so as to effectively achieve message broadcasting by way of multiple unicast transmissions. The wireless devices may also be configured to not respond to FTM request messages, e.g., to not send an ACK message or any other type of message responsive to an FTM request, or alternatively, in the event that wireless devices do send acknowledgement message, to disregard ACK messages received from other wireless devices.

In some embodiments, an FTM request (FTMR) message may include a category field indicating the general use for which the FTMR message is directed, a public action field holding a value indicating the type of action frame that is to be communicated (and thus the formatting to be followed for the particular action frame specified), and a trigger field to indicate the type of operation the requesting wireless device is asking the second (responding) wireless device to perform (for example, setting the trigger field to a value of zero ('0') may indicate that the initiating device is requesting that the second wireless device not send any response fine timing measurement frames). An FTMR message may also include an LCI measurement request field (containing for example, latitude/longitude coordinate values), a location civic measurement request field, and a fine timing measurement parameters field (including different settings values that are requested by the initiating STA and allocated by the responding STA).

As with broadcast message formatted according to IEEE 802.11, FTMR messages may also include information element fields to hold miscellaneous data. Thus, for example, an FTMR message transmitted by one of multiple wireless devices may include, in one or more such information element fields, timing information and/or identification information pertaining to broadcast messages from one or more wireless devices (e.g., the non-stationary devices depicted in FIG. 1) from which the ranges between those non-stationary devices may be derived. Further details regarding the data (e.g., timing information relating to broadcast messages, including timing information for previously received broadcast messages) that may be included in the information element(s) of an FTMR broadcast message is provided with respect to FIG. 2.

In some embodiments, the broadcast messages periodically transmitted by the wireless devices (e.g., the devices 112, 122, and/or 132 of FIG. 1) may be dedicated short range communications (DSRC) broadcast messages that are sometimes employed by vehicular systems (to provide a basic safety message where devices periodically announce their positions, velocity and other attributes to other devices, thus enabling the neighboring traffic to track their positions and avoid collisions, improve traffic flow, etc.) In some embodiments, the DSRC broadcast messages may include timestamp and/or identification information (based on which ranging/location information may be determined, as described herein) included in dedicated fields of the DSRC messages, or, alternatively, included in an information element field of the DSRC messages (e.g., information element field of a basic safety message, or BSM). In some embodiments, other types of communication protocols may be used for transmitting broadcast messages based on which ranging data for non-stationary wireless devices (transmitting such broadcast messages) may be derived.

Figure 2:
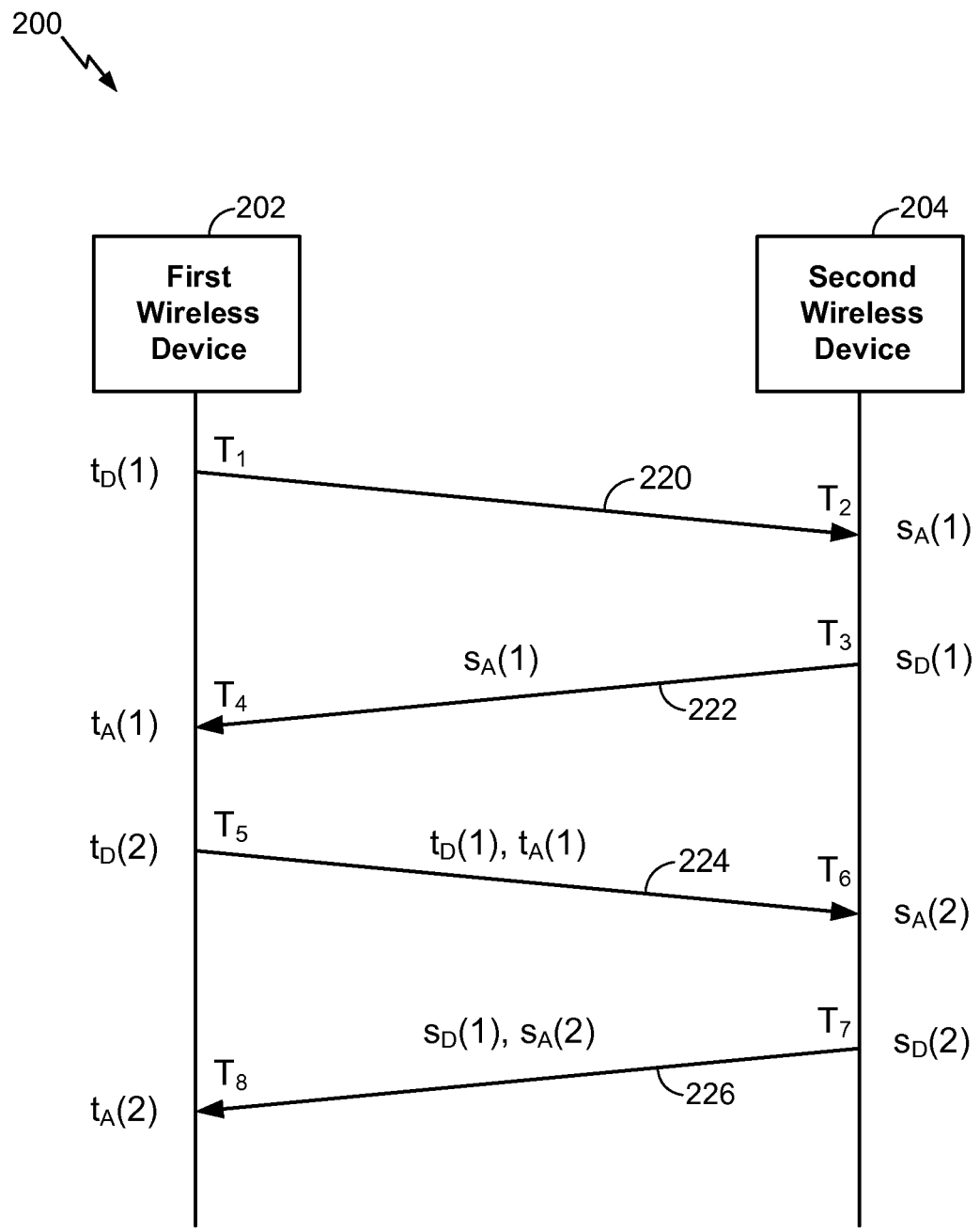
FIG. 2 is a flow diagram of a communication flow for broadcast messages exchanged between two wireless devices.

With reference now to FIG. 2, a flow diagram of a communication flow 200 for broadcast messages exchanged between two wireless devices 202 and 204 (either of which may be similar to, in their configurations and/or functionalities, to any of the wireless devices 112, 122, and/or 132 depicted in FIG. 1) that provides information to enable estimating the distance or range between the two devices. For example, the first wireless device 202 may compute a range to the second wireless device 204 from the following timing information:

1. Timestamps associated with the first wireless device 202 broadcast messages, including for example:
   a. Time-of-Departure (ToD), denoted $t_D(n)$ in FIG. 2, of messages broadcasted by the first wireless device, as recorded by the first wireless device. Typically, the ToD for a particular message is not included with that particular message (the exact ToD is generally not known with sufficient precision until the broadcast message actually departs the wireless device), but instead may be transmitted in a subsequent message. Under those circumstances, the subsequent message may include the ToD for the earlier message, and identification information to identify the message to which the ToD corresponds.
   b. Time-of-Arrival (ToA), denoted $s_A(n)$ in the example of FIG. 2, of messages broadcasted by the first wireless device and received by the second wireless device. The ToA for messages transmitted by the first device are obtained by the first wireless device from messages subsequently broadcasted by, for example, the second wireless device.
2. Timestamps associated with broadcast messages from the second wireless device, including for example:
   a. ToDs of messages broadcast by the second wireless device, denoted $s_D(n)$ in FIG. 2, as recorded by the second wireless device, which are obtained by the first wireless device from messages subsequently broadcasted by the second wireless device.
   b. ToAs of messages broadcast by the second wireless device and received by the first wireless device, denoted $t_A(n)$ in FIG. 2. The ToA's, $t_A(n)$, are determined (e.g., measured) by the first wireless device.

Accordingly, as illustrated in the example communication flow 200 of FIG. 2, the first wireless device 202 may periodically (e.g., at pre-determined intervals that may be controlled by a user) transmit broadcast messages, and may thus transmit at a first time instance $T_1$ (vertical positions along the vertical lines extending from the blocks representing the first and second wireless devices 202 and 204 correspond to different time instances) a first broadcast message 220. The time $T_1$ is also the time-of-departure $t_D(1)$ for the first message from the first wireless device 202, and is recorded and stored in a memory element of the device 202. However, because the time of departure can generally only be determined close to when the message is being broadcast, that time, typically, is not included in the information contained in the transmitted broadcast message 220.

The first broadcast message 220 is received at the second wireless device 204 at a second time instance $T_2$, and is recorded as the ToA, $s_A(1)$, for the first broadcast message 220. Although the diagram of FIG. 2 shows only the second device 204 receiving the first broadcast message 220, other wireless devices, configured to receive broadcast messages such as the first broadcast message 220, in order to determine ranges from those other wireless devices to the first wireless device and/or to some other wireless devices, can received the first broadcast message 220. It will be appreciated that those other wireless devices may receive the first broadcast messages at different times, which depend on the specific distances (ranges) between the first wireless devices and those other wireless devices. The second wireless device 204 obtains from the signals constituting the first broadcast message 220 (e.g., by processing the first broadcast message to, for example, extract and decode the content-based data placed on the signals constituting the first broadcast message 220) information pertaining to the first broadcast message, as well as any information included with the first broadcast message pertaining to earlier broadcast messages. For example, the first broadcast message may include time-of-arrival information for previous messages received at earlier times (i.e., times earlier than $T_1$) by the first wireless device, data identifying the wireless nodes/devices that transmitted those earlier broadcast messages, data identifying the broadcast messages transmitted (e.g., each broadcast message may be assigned a unique message ID number), the ToD of any earlier message transmitted by the first wireless device, etc.

At a subsequent time $T_3$ (such time may be based on the pre-determined periodicity at which the second wireless device 204 transmits broadcast messages), the second wireless device transmits a broadcast message 222 (which is referred to as the "second broadcast message" of the communication flow 200 of FIG. 2) that is received by the first wireless device 202 at a time instance $T_4$, and that message 222 is used by other wireless devices, including the first wireless device 202 of FIG. 2, to obtain information about the second broadcast message 222 that may subsequently be used (by the receiving wireless devices) to derive ranges from the receiving wireless device to the second wireless device 204. Thus, in the example of FIG. 2, the first wireless device determines the ToA, $t_A(1)$, for the second broadcast message (i.e., the time-of-arrival of the second broadcast message 222 at the first wireless device). Additionally, the second wireless device 204 includes with the transmitted second broadcast message 222 at least some of the information related to the first broadcast message. For example, data representative of the ToA, $s_A(1)$, of the first broadcast message 220 at the second wireless device 204 may be included (e.g., encoded as digital data in a body of a packet-type message) with the second broadcast message 222. The second broadcast message may also include information relating to other earlier messages received either by the second wireless device 204 or by other wireless devices. For example, the time-of-arrival of various other broadcast messages at the second wireless device 204 prior to the time $T_3$ may be included with the second broadcast message 222. Additionally, some or all of the information regarding earlier broadcast messages that was included in the data contained by the first broadcast message 220 may be added to the second broadcast message 222 (due to bandwidth constrains, each wireless device transmitting a broadcast message may be able to include only a portion of all the information it previously obtained from broadcast messages it received).

At time $T_5$ the first wireless device 202 transmits a further broadcast message 224 (the message 224 may be transmitted at the scheduled periodic time instance at which the first wireless device 202 is configured to transmit broadcast messages) that includes at least some of the information relating to messages previously received at the first wireless device. As illustrated in FIG. 2, the first wireless device 202 includes with the broadcast message 224 at least the time-of-arrival, $t_A(1)$ of the broadcast message 222 at the first wireless device, and the time-of-departure, $t_D(1)$, of the previously transmitted broadcast message 220 that the first wireless device 202 transmitted at $T_1$ (as noted, the ToD, $t_D(1)$ may have been previously recorded by the first wireless device 202 when it transmitted the broadcast message 220). Although not specifically shown, the message 224 may further include information (e.g., timing information, identification information, etc.) pertaining to other messages it received from other wireless devices. For example, the message 224 may include the ToA for at least some of the messages it receives in the time interval between any two broadcast messages that the first wireless device 202 transmitted (e.g., the ToA's for any broadcast message it received between $T_1$ and $T_5$, in the example of FIG. 2). In some embodiments, the message 224 (as well as other broadcast messages) may also include information included with, for example, earlier received messages (such as the message 222). For example, information included (e.g., encoded or embedded) in the message 222, such as the time-of-arrival, $s_A(1)$, for the message 220 at the second wireless device 204, may be included with subsequent broadcast messages such as the messages 224, 226, etc. Depending on bandwidth constraints, the information included may pertain to messages that may have been received by the first wireless device 202 prior to $T_1$. Thus, in such embodiments, the message 224 may include information that may have been previously included, and transmitted, in earlier messages from the first wireless device 202 (i.e., information relating to a particular received message may be included multiple times in multiple broadcast transmissions from the wireless device that received the particular message). The time-of-departure, $t_D(2)$ of the message 224 from the first wireless device 202 is recorded, and would generally be transmitted in a subsequent broadcast message from the first wireless device 202.

At $T_6$ the second wireless device receives the broadcast message 224, and the time-of-arrival, $s_A(2)$ of the message 224 at the second wireless device 204 is measured and recorded. The message 224 is also received at other wireless devices in the vicinity of the first wireless device 202 at times, typically different from $T_6$, that depend on the distance of those other wireless devices from the first wireless device 202. The second wireless device prepares the data to be transmitted with its subsequent broadcast message, with that data including, for example, identification information for the subsequent broadcast message (message ID and/or device ID for the second wireless device), and timing data for previously received message, including at least the time-of-arrival, $s_A(2)$, at the second wireless device 204 for the message 224, and the time-of-departure of the earlier broadcast message transmitted by the second wireless device 204 (namely, the time $s_D(1)$ corresponding to the message 222). In addition, the data to be transmitted may include timing information related to previously received messages from other wireless devices, earlier time-of-arrival information for messages from the first wireless device (e.g., the timing information $s_A(1)$ for the message 220 that was previously received), previously sent time-of-departure information, timing information included with previously received messages (e.g., $t_D(1)$, $t_A(1)$) etc. The data assembled is then included and transmitted in a broadcast message 226 (sent out at $T_7$).

Figure 3:
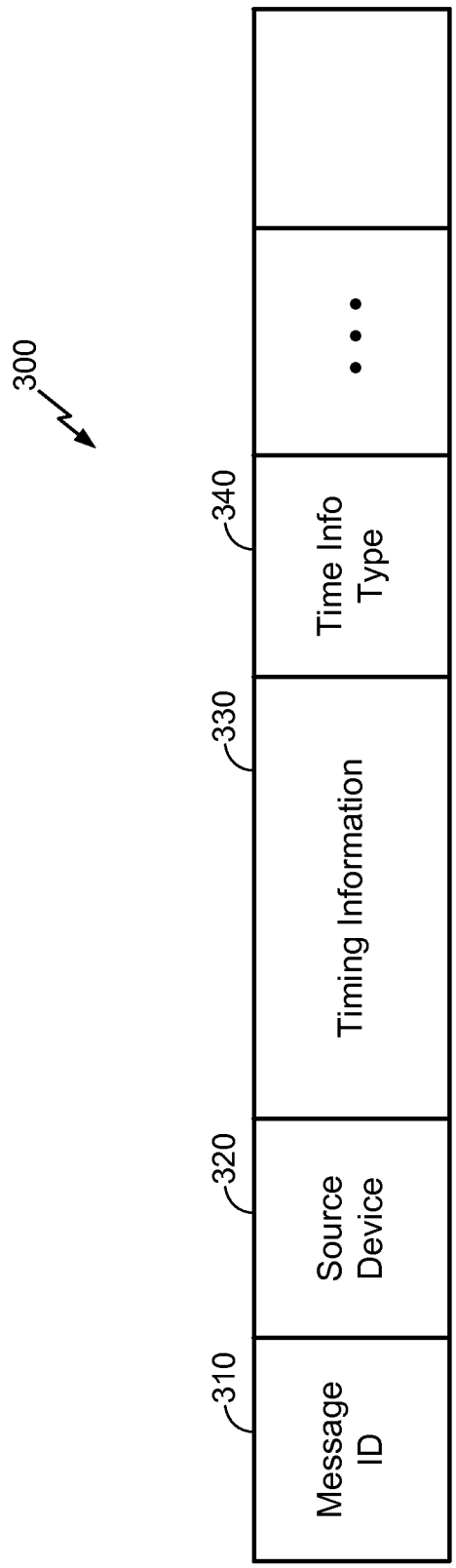
FIG. 3 is a schematic diagram of an example data segment that may be included in a broadcast message.

With reference now to FIG. 3, a schematic diagram of an example data segment 300 that may be included in a broadcast message, and which provides information relating to a previously received message, is shown. As noted, a broadcast message, such as the broadcast messages 220, 222, 224, and 226 depicted in FIG. 2, may each include one or more such segments, with each segment containing information relating to a different broadcast message. As shown, the data segment 300 may include a message identification field 310 to hold data to identify the message with respect to which timing information is to be provided. The message identification may be a unique value assigned to the message. The segment 300 further includes a source device field 320 that holds identifying data to identify the wireless device from which the message (identified in the message field 310) was originally transmitted. In some embodiments, the message field 310 and the source field 310 may be combined to hold a composite value identifying the device and message. For example, a first portion of the value may indicate the wireless device that sent the particular message the segment 300 pertains to, and then a second portion of the value may be an incrementally assigned value to represent the message number (e.g., if the message in question is the $10^{th}$ message transmitted by the particular wireless device from the beginning of the day, or some other reference time, the message identification portion may be the value 10).

The data segment 300 also includes a time field 330 with a time (and possibly date) corresponding to the message in question (i.e., the message identified in the fields 310 and/or 320). In some embodiments, the time/date information may be obtained using an internal clock employed by the device that obtained/recorded the timing information included in the time field 330. In some embodiments, the data held in the time field 330 may have been adjusted to account for clock drift and/or adjusted to be represented according to a global time maintained by some reference clock. As further shown, the data segment 300 may also include an information type field 310 to indicate the type of timing information that is included in the data segment (e.g., time-of-arrival timing information, time-of-departure timing information, etc.) Additional information pertaining to the message identified by the fields 310 and/or 320 of the data segment 300 may also be included. The fields of the data segment 300 may be of any given size, which may depend on bandwidth constraints, costs, etc.

Furthermore, to increase the number of data segments that can be included in any particular broadcast message (to provide information related to a large number of previously transmitted broadcast messages), the information in each message segment may be truncated so as to remove one or more of the fields (e.g., the message identification field 310), remove the most-significant-bits in each of fields constituting the message segment, etc. an implementation to remove the most significant bits of, for example, timing information included in the broadcast messages is predicated on the assumption that because each vehicle is getting periodic ranging estimates, an approximate distance estimate at the current time, corresponding to the higher-order bits, is known, and only the lower-order bits are needed to enhance the estimation accuracy.

More particularly, denote the compressed timestamp for $\Delta s_A(n)$ as $[\Delta s_A(n)]$. Then:

$$[\Delta s_A(n)] \triangleq 10^9 \cdot [\Delta s_A(n)] \bmod 2^L$$

for some fixed positive integer L. Assuming that $\Delta s_A(n)$ is measured in seconds with a nanosecond resolution, then the quantity $[\Delta s_A(n)]$ can be encoded using L bits. These L bits are then transmitted from a remote to a local vehicle.

To recover $\Delta s_A(n)$ from $[\Delta s_A(n)]$, it is observed that:

$$10^9 \cdot \Delta s_A(n) = [\Delta s_A(n)] + k_A(n) 2^L$$

for some integer $k_A(n)$. Thus, the aim of the local vehicle is to determine $k_A(n)$. It can be shown that:

$$\hat{k}_A(n) = \left\lfloor \left( 10^9 \frac{\Delta t_D(n)}{\Delta t_D(n-1)} \Delta s_A(n-1) - [\Delta s_A(n)] \right) / 2^L \right\rfloor$$

is an appropriate estimator for $k_A(n)$. Here, the operator $\lfloor \cdot \rfloor$ rounds its argument to the closest integer. It is to be noted that $\Delta t_D(n)$ and $\Delta t_D(n-1)$ are available at the local vehicle since they are locally measured and $\Delta s_A(n-1)$ is available by assumption. Furthermore, it can be shown that if the number of bits, L, is larger than $\log(2 \cdot 10^9 \rho \cdot \Delta t_D(n))$ where $\rho$ is an a priori upper bound on the maximal variation of $\Delta s_A(n)/\Delta t_D(n)$ in one time step, then $\hat{k}_A(n)$ is equal to $k_A(n)$, and $\Delta s_A(n)$ can be recovered from its compressed value $[\Delta s_A(n)]$. In a broadcasting protocol based on DSRC, L is determined to equal 7.7, meaning that 8 bits are needed to transmit $[\Delta s_A(n)]$, and thus, to transmit timing information corresponding to, for example, the time-of-arrival of a message previously received at a wireless device that is to transmit in a broadcast message, 1 byte may be sufficient. Experimentation and testing have shown that, in practice, a more conservative number of L=12 bits may be used in order to handle situations with dropped or NLOS measurements.

Thus, in some embodiments, under the assumption that $\Delta s_A(n-1)$ has already been recovered, the data for $\Delta s_A(n)$ may be recovered from $[\Delta s_A(n)]$. In some embodiments, to start the recovery process, the initial measurement $\Delta s_A(1)$ may be transmitted uncompressed. Alternatively, $[\Delta s_A(1)]$ (i.e., the compressed value corresponding to $\Delta s_A(1)$) and $[\Delta s_A(2)]$ can be decompressed jointly by, for example, solving a Diophantine approximation problem. It will be noted that compression and decompression of the other timing information values (e.g., the timestamps for $\Delta s_D(n)$, $\Delta t_A(n)$, $\Delta t_D(n)$, etc.), may be similarly performed.

Alternatively and/or additionally, in some embodiments, compression schemes (lossy or lossless) may be applied to the data held in one or more of data segments included in a broadcast message (for example, earlier data segments may be compressed to a higher degree than more recently constructed data segments).

From time to time, a wireless device (from the multiple wireless devices receiving and broadcasting messages that include timing and identification information relating, for example, to previously received broadcast messages and to a current broadcast message) is configured to use the information it obtained over a period of time (which may be a pre-determined time period that is the same or different from the period at which the devices transmit their broadcast messages) to determine ranges (distances) between itself and one or more of the other wireless devices (e.g., non-stationary wireless devices) from which it received broadcast messages. In some embodiments, a first wireless device (such as the wireless device 202 of FIG. 2) computing a range to a second wireless device (such as the device 204 of FIG. 2) may need to account for relative clock drift between a clock of the first wireless device and a second clock of the second wireless device, and to also account for the mobility, if any, of the devices. Both relative clock drift and mobility change slowly over time. Therefore, in some embodiments, low-order models can be utilized to derive range values between the first wireless device and the second wireless device (e.g., through an optimization process). Low-order models reduce the number of unknown parameters and thus make range estimation feasible. Some specific examples for low-order models include: 1) a linear model to approximate relative clock drift, and 2) a quadratic model to approximate range between two devices.

Generally, the local time t (e.g., of the first wireless device 202 in the example illustrated din FIG. 2) and the remote time s (e.g., for the second wireless device 204 of FIG. 2) are related via the linear relationship: $s(t)=\theta+(1+\delta)t$, where $\theta$ is the clock offset and $\delta$ is the clock drift. Typical values of $\delta$ are on the order of $\pm 10^{-5}$, which is usually expressed as a drift of 10 parts per million (ppm). In the periodic broadcast ranging approach described herein, the delay between a message departure and the following message arrival may be on the order of T/2. Hence, the clock drift during this period is on the order of $\delta T/2$. For example, in the DSRC case with T=0.1 s, the drift of a 10 ppm clock during that time is on the order of 0.5 ms. When left uncompensated, this clock drift of 0.5 ms could result in a ranging error of approximately 150 m. Careful modeling and dealing with clock drifts is thus important for successful ranging using the periodic broadcast approach.

Continuing with the DSRC example, assume that a ranging accuracy on the order of 0.3 m is sought, in which case an uncompensated clock drift of at most 0.01 ppm may be tolerated between successive samples. Measurements of WiFi receiver clocks suggest the clock drift may be modeled as being approximately constant for a window of a few seconds (corresponding to a few tens of DSRC message exchanges).

The departure and arrival timestamps can thus be related as:

$$s_A(n)=\theta+(1+\delta)t_D(n)+d_D(n)/c+z_A(n)$$

$$s_D(n)=\theta+(1+\delta)t_A(n)-d_A(n)/c+z_D(n)$$

where $d_D(n)$ and $d_A(n)$ are the inter-vehicle distances at times $t_D(n)$ and $t_A(n)$, where c is the speed of light, and where $z_A(n)$ and $z_D(n)$ are additive receiver noise terms assumed to be independent and identically distributed (i.i.d.) with mean zero and variance $\sigma^2$. The above relationships hold true assuming that the vehicle movement and the clock drift are negligible during the packet time of flight between the two vehicles. Because this time of flight is less than 300 ns for vehicle distances less than 100 m, this assumption is reasonable. The above relationship links the departure and arrival information (which may be represented as time-stamps) to the inter-vehicle distances. Because of the movement of the vehicles, these distances are time-varying (i.e., change as a function of n). Since the vehicle distances can change by several tens of meters per second, this time-varying nature of the distances needs again to be taken into account when using periodic packet broadcasts for ranging. For example, in DSRC with T=0.1 s, the change in distances can be on the order of several meters between successive message arrivals.

The parameters associated with the models employed to estimate range and/or clock drift may need to be re-estimated based on the time-scales involved. A process for joint estimation of model parameters may include weighted local polynomial regression. For example, the following process may be used to jointly solve for clock drift $\delta$ and distance $d_a(n)$ based on timing measurements obtained for broadcast measurements involving a first wireless device and a second wireless device (such as the wireless devices of FIG. 2). In the range and clock drift estimation process, the timing measurement $t_a(n)$ corresponds to $n^{th}$ time-of-arrival for a message from the second wireless device, $t_d(n)$ corresponds to the $n^{th}$ time-of-departure of a message from the first wireless device, both measured with respect to the clock of the first wireless device. $s_a(n)$ corresponds to $n^{th}$ time-of-arrival measured at the second wireless device for a message from the first wireless device, and $s_d(n)$ corresponds to the $n^{th}$ time-of-departure of a message from the second wireless device, both measured with respect to the clock of the second wireless device.

The process of jointly estimating the range and clock drift between a first and a second wireless device, based on timing measurements for broadcast messages between the two device can thus involve, in some embodiments, a minimization of the following expression:

$$(c\Delta s_a(n)-(1+\delta)c\Delta t_d(n)-a_1 t_d(n)-a_2 t_d^2(n)+a_1 t_d(n-1)+a_2 t_d^2(n-1))^2+(c\Delta s_d(n)-(1+\delta)c\Delta t_a(n)-2a_0-a_1 t_d(n)-a_2 t_d^2(n)-a_1 t_d(n-1)-a_2 t_d^2(n-1))^2+\ldots+(c\Delta s_a(n-w)-\ldots)^2+(c\Delta s_d(n-w)-\ldots)^2$$

where w, in the above expression, is the window length (which is used to determine the number of past measurements used to estimate the parameters for the current time). The above minimization can then be presented in matrix form as a minimization of the following expression:

$$\|\beta-Bx\|^2$$

$$\beta=c[\Delta s_a(n-w:n)-\Delta t_d(n-w:n);\Delta s_d(n-w:n)-\Delta t_a(n-w:n)]$$

$$B=[\Delta t_d(n-w:n),0,t_d(n-w:n)-t_d(n-w-1:n-1),t_d^2(n-w:n)-t_d^2(n-w-1:n-1);$$

$$\Delta t_a(n-w:n),2,t_d(n-w:n)+t_d(n-w-1:n-1),t_d^2(n-w:n)+t_a^2-(n-w-1:n-1)]$$

$$x=[c\delta;a_0;a_1;a_2]$$

where c is speed of light, x is a vector of parameters (as defined in the last bullet above), $\delta$ is the drift, and $a_0$, $a_1$ and $a_2$ are the parameters of the quadratic fitted to the vehicular distances over the window.

The closed-form solution is then:

$$\hat{x}=(B^T B)^{-1} B^T \beta$$

From this, the distance estimate (represented, for example, using a low-order quadratic model) may be derived according to:

$$\hat{d}_a(n)=a_0+a_1 t_a(n)+a_2 t_a^2(n)$$

In some embodiments, when deriving the distance (range) estimates, it may be reasonable to give less weight to old measurements. This may be implemented through a diagonal weight matrix, W. In some embodiments, the diagonal elements of W can be computed using a tricube weight function applied to the normalized time offsets within the window. For example, a weighted least-squares solution can be expressed as:

$$\hat{x} = (B^T W B)^{-1} B^T W \beta$$

In some embodiments, the correlated nature of transformed ranging noise may be taking into account when deriving range estimates. Estimates taking into account the transformed ranging noise may be improved by first whitening the observations.

In an alternate process, all devices calculate ToD and ToA timestamps with respect to a reference clock. For example, this reference clock could be associated with a selected cluster head. Note that only clock drift correction is required for the above method.

Figure 4:
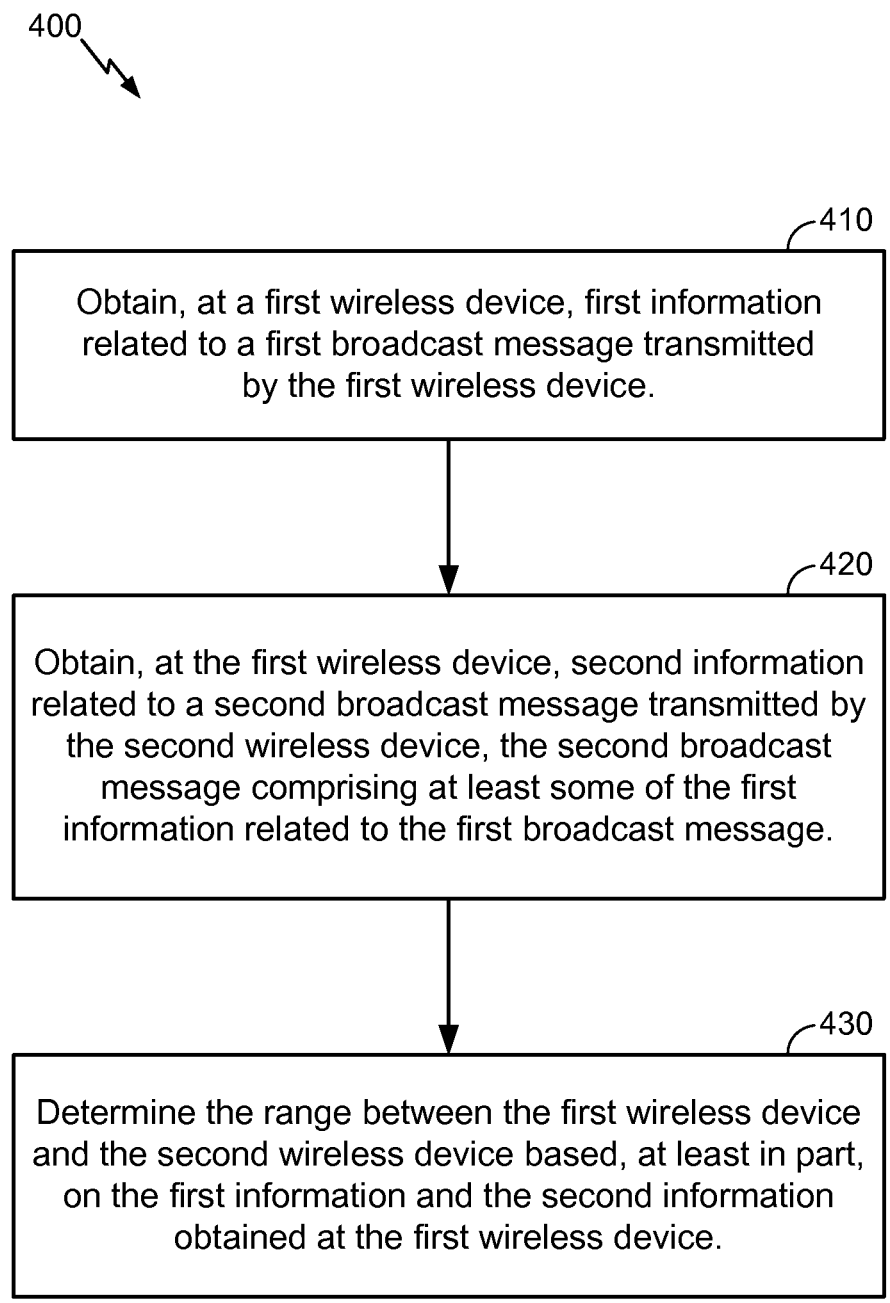
FIG. 4 is a flowchart of an example procedure to determine range estimates between two or more wireless device.

With reference now to FIG. 4, a flowchart of an example procedure 400 to determine range estimates between two or more wireless device (e.g., moving (non-stationary) wireless devices) is shown. The procedure 400 includes obtaining 410, at a first wireless device (e.g., a local wireless device, such as the device 202 depicted in FIG. 2, that is configured to determine its range to a second wireless device), first information related to a first broadcast message transmitted by the first wireless device. As described herein, in some embodiments, the information obtained with respect to a broadcast message (such as the broadcast messages 220 and/or 224 of FIG. 2) may include the time-of-departure (ToD) of those messages, in which case, the first wireless device may record those respective ToD's, but not necessarily include them with the broadcast messages. However, in some embodiments, the ToD for one broadcast message may be included with a subsequent message. Thus, in the example of FIG. 2, the ToD for the message 220 (e.g., the timing information denoted as $t_D(1)$) may be included with the subsequent broadcast message 224.

As further shown in FIG. 4, the procedure 400 also includes obtaining 420, at the first wireless device, second information related to a second broadcast message transmitted by the second wireless device. For example, in some embodiments, the information related to the second message (such as the message 222 depicted in FIG. 2) may include the time-of-arrival (ToA) of the broadcast message 222 at the first wireless device. The second broadcast message includes at least some of the first information related to the first broadcast message. For example, when the second wireless device receives the broadcast message (e.g., the message 220) transmitted by the first wireless device, the second wireless device records that ToA (denoted, in the example of FIG. 2, as $s_A(1)$ for the message 220) and then includes that ToA information (e.g., in the form of a timestamp) with its next periodic broadcast message (in this case, the broadcast message 222). Additionally, depending on bandwidth constraints, the second wireless device includes timing information (e.g., ToA) for other previously received broadcast messages, including previously received broadcast messages from one or more other wireless devices. The additional information, pertaining to those other previously received messages, may include timing information for those messages (e.g., those messages' time-of-arrival at the second wireless device, identification information, such as message ID information, wireless device ID information, etc.), and may also include at least some of the timing information that was included/encoded in the broadcast messages it received. As noted herein, because a broadcast message may include a large volume of information pertaining to a potentially large number of earlier messages (transmitted from a potentially large number of broadcasting wireless devices), in some embodiments, the data included within broadcast messages (e.g., the messages 222 and 224, as well as the messages 220 and 226, illustrated in FIG. 2) may be compressed. For example, in some implementations, data (such as timestamp data) may be compressed by removing the most significant bits for timestamp data (e.g., retaining and transmitting only the 8-12 least significant bits of a particular timestamp value).

With continued reference to FIG. 4, having obtained the first information for the first broadcast message (transmitted by the first wireless device) and the second information for the second broadcast message (received by the first wireless device), the range between the first wireless device and the second wireless device is determined 430 based, at least in part, on the first information and the second information obtained at the first wireless device. In some embodiments, determination of the range between the first and second wireless devices may include deriving the range by applying the first information and the second information to one or more of, for example, a low-order linear model, a low-order quadratic model, and/or a weighted local linear regression. For example, and as described herein, the range between the first wireless device and the second wireless device may be derived using a least-square minimization procedure using timing information obtained by the first wireless device (as discussed, for example, in relation to the above equations). In some embodiments, one or both of the first information and the second information may be adjusted to account for relative clock drift between a first clock associated with the first wireless device and a reference clock. The reference clock may be a second clock associated with the second wireless device. The reference clock may be selected based on a signaling exchange between the first wireless device and the second wireless device.

With reference again to FIG. 1, as noted, in some embodiments, one or more of the non-stationary wireless devices may be in communication with a mobile device capable of determining its position, e.g., based on signals from satellites or from terrestrial stationary access points, through implementation of, for example, multilateration-based procedures and/or fingerprinting procedures according, for example, to time of arrival techniques, signal strength measurements, etc. The wireless device 112 may establish a communication link with the mobile device 114 (the communication link may be a near-field link, such as Bluetooth® wireless technology, a WLAN link, etc.)

Thus, when a mobile device configured to determine its position is in the vicinity of one of the broadcasting wireless devices, such as the wireless device 112 of FIG. 1, or the first wireless device of FIG. 2, and establishes a communication link with that wireless device (e.g., initiated by either the mobile device or by the wireless device), the wireless device may, in such embodiments, receive from the mobile device, located proximate to the wireless device, a location estimate determined by the mobile device. The wireless device can then derive a first approximate position of the first wireless device (e.g., in some embodiments, the wireless device's position is estimated to be at the same position as the mobile device). The wireless device may also derive an approximate position of another wireless device (e.g., the wireless devices 122 and/132 of FIG. 1, or the second wireless device 204 of FIG. 2) based on the location estimate determined by the mobile device, and based on the range between the wireless device and the other wireless device determined based (at least in part) on the first information and the second information (as more particularly described herein). Here too, positions of the other wireless device may be derived using an optimization procedure, or through some other position determination process. In some embodiments, the wireless device may receive location and range estimate from multiple mobile devices. This is typically required to compute a good position estimate at the wireless device.

In some embodiments, the derived estimate of the wireless device may subsequently be included as another information element in the periodic broadcast messages transmitted by that wireless device. By providing the wireless device's position estimate to other wireless devices (via the broadcast messages in which that position estimate was included), other wireless devices receiving those broadcast message may use the position estimate information for the transmitting wireless device to facilitate determining ranges to the transmitting wireless device and/or determine their own position estimates.

Figure 5:
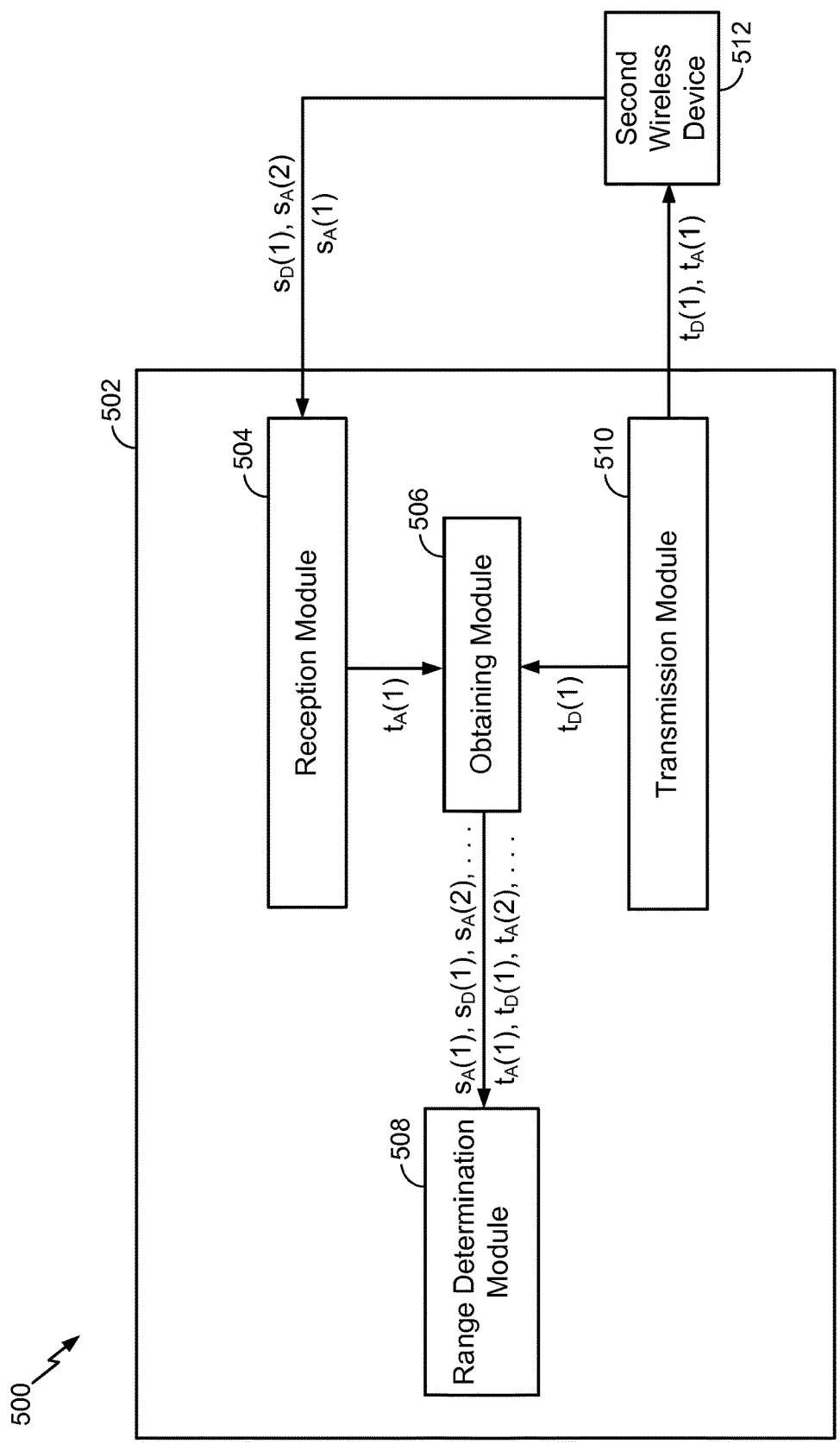
FIG. 5 is a conceptual data flow diagram illustrating the data flow between different modules/means/components in an example apparatus.

With reference now to FIG. 5, a conceptual data flow diagram 500 illustrating the data flow between different modules/means/components in an example apparatus 502 is shown. The apparatus may be a first wireless device (similar in its realization and/or functionality to any of the devices 112, 122, 132, 202, or 204 shown in FIGS. 1 and 2) configured to estimate a range between itself and a second apparatus 512. The apparatus 502 includes a reception module 504, an obtaining module 506, a range determination module 508, and a transmission module 510.

The reception module 504 is configured to receive messages broadcasted by the second apparatus 512 and/or by other wireless devices transmitting broadcast messages (e.g., broadcast messages such as a beacon frame message configured according to IEEE 802.11 standard, a fine timing measurement (FTM) protocol-based message, a dedicated short-range communication (DSRC) message, etc.) As described herein, received broadcast messages may include information (e.g., timing information, represented using timestamps) related to earlier broadcast messages that were received at the second apparatus 512 (including earlier messages from the first apparatus 502). The received broadcast messages may also include information pertaining to the actual currently received broadcast messages (e.g., identification information).

The transmission module 510 is configured to transmit broadcast messages from the first apparatus 502, with such broadcast messages including, for example, a beacon frame message configured according to IEEE 802.11 standard, a fine timing measurement (FTM) protocol-based message, a dedicated short-range communication (DSRC) message, other types of packet-based or non-packet-based broadcast transmissions, etc. The obtaining module 506 obtains first information related to messages broadcasted by the first apparatus (e.g., time-of-departure of broadcast messages the first apparatus transmits, e.g., via the transmission module 510), and second information related to messages broadcasted by the second apparatus 512 (e.g., time-of-arrival of messages received, for example, via the reception module 504). As noted, the obtaining module may also extract from received message data pertaining to earlier broadcast messages (with such messages having been received by the second apparatus 512, and at least some of their corresponding information included within the body of subsequently transmitted broadcast messages). Time-of-departure information for broadcast message transmitted by the first apparatus 502 may be recorded, for example, by the obtaining module 506 (and stored in a memory device coupled to the obtaining module 506), and, similarly, time-of-arrival information for received broadcast messages may likewise be recorded by the obtaining module 506. The range determination module 508 is configured to determine the range between the first apparatus 502 and the second apparatus 512 based on the first information and the second information.

The first apparatus 502 may include additional modules that perform one or more of the operations described in relation to FIGS. 1, 2, and 4. As such, of the operations depicted in FIGS. 2 and 4, for example, may be performed by a module and the apparatus may include one or more of those modules. The modules may be implemented as one or more hardware components specifically configured to carry out the processes described herein, may be implemented by a processor configured to perform the processes described herein, or may be implemented through computer-readable medium executable on a processor, or some combination thereof.

Passive Positioning Systems

Figure 6:
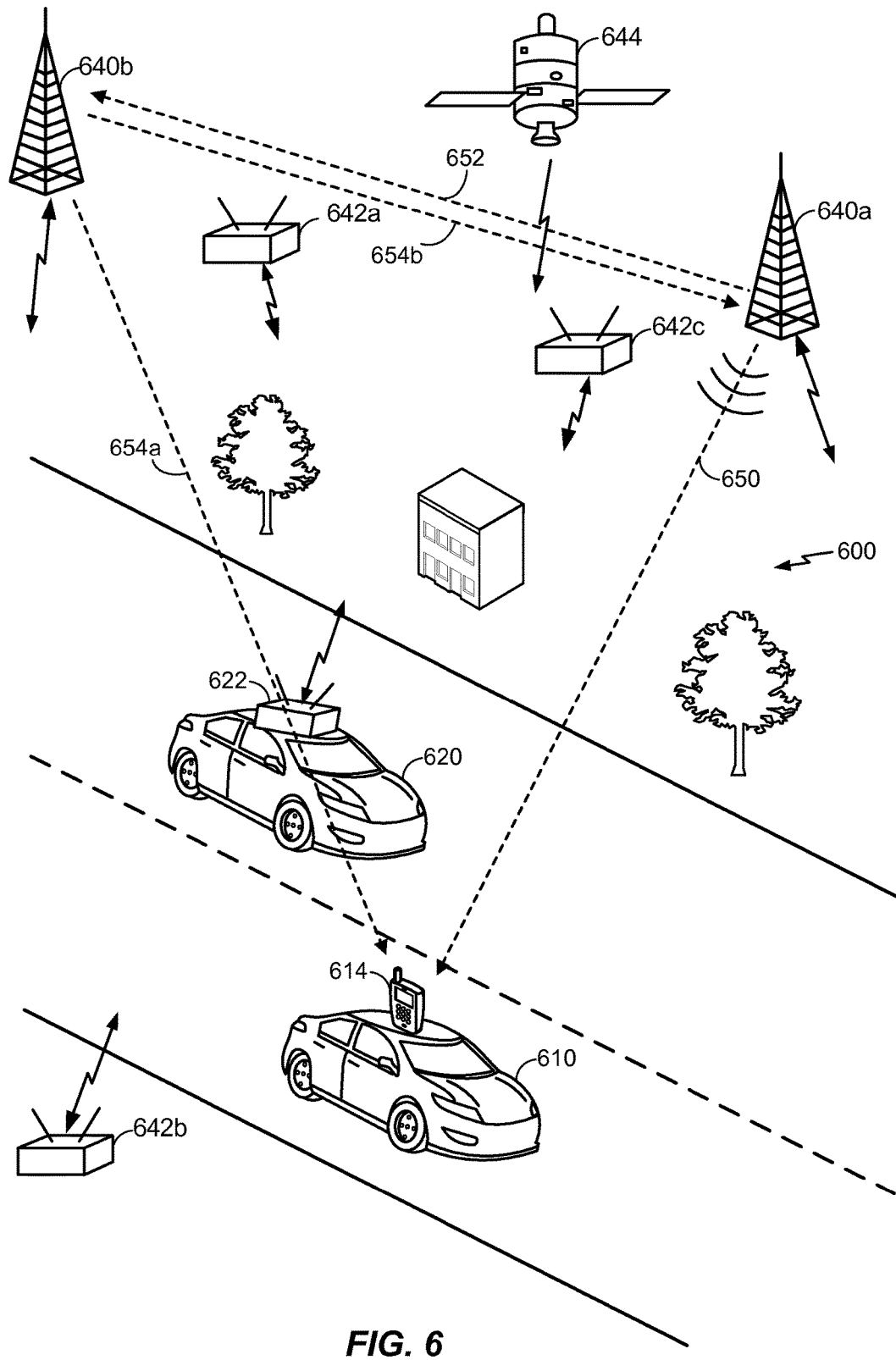
FIG. 6 is a schematic diagram of another example system to determine location information for a mobile device based on broadcast messages sent by stationary wireless devices.

With reference now to FIG. 6, a schematic diagram of another example system 600 to determine location information (e.g., range and/or location estimates) based on broadcast messages sent by stationary wireless devices is shown. In the example embodiments of FIG. 6, the wireless devices transmitting the broadcast messages include stationary wireless devices (e.g., WLAN access points, such as WiFi access points, WWAN base stations, non-moving mobile devices, etc.) with known locations. Thus, as shown in FIG. 6, the system 600 includes stationary wireless devices 642*a-c*, which may be similar to (in implementation and/or functionality) to any of the wireless devices 112, 122, 132, and/or 142 depicted in FIG. 1, with at least one of those stationary wireless devices configured to transmit periodic broadcast messages (such as any of the broadcast messages 220, 222, 224, and 226 shown in FIG. 2) that include information pertaining to the currently transmitted broadcast messages, as well as information pertaining to earlier broadcast messages that were previously received (e.g., during some time interval prior to the current transmission) by the transmitting wireless devices. The system 600 may also include, in some embodiments, WWAN wireless devices 640*a-b* (e.g., base stations), which may be similar (in implementation and/or functionality) to the wireless device 140 depicted in FIG. 1, and at least one of these wireless devices 640*a-b* may be configured to transmit periodic broadcast messages, such as a periodic broadcast message 650 depicted in FIG. 6 (which may also be similar to any of the messages 220, 222, 224, and/or 226 of FIG. 2) with information relating to a current message it is transmitting, as well information relating to broadcast messages the WLAN wireless device(s) previously received.

As further shown in FIG. 6, the system 600 also includes a mobile wireless device 614, such as a personal mobile phone, which may be similar (in implementation and/or functionality) to the mobile device 114 of FIG. 1. The mobile wireless device may be moving, and thus its location is generally not known and needs to be determined (e.g., based on broadcasting messages it receives, as described herein). The mobile device 614 is generally a passive device configured to receive (i.e., eavesdrop) messages (including broadcast messages from at least one wireless device transmitting periodic broadcast messages) originating from the various wireless devices in its vicinity, but does not necessarily transmit any reply or broadcasting communications (although, in some embodiments, the mobile device 614 may be implemented with a transmission functionality to transmit unicast or broadcast messages configured similarly to the broadcast messages transmitted by the wireless devices 640a-b and/or 642a-c, or configured according to any other communication protocol). The mobile device 614 (optionally facilitated by a remote server, such as the server 150 of FIG. 1) is configured to determine location information (e.g., range estimates to one or more other wireless devices and/or actual location estimate) based, in part, on broadcast messages received from one or more of the wireless devices 640a-b and/or 642a-c, and on location information for the stationary wireless devices transmitting those messages passively picked up (received) by the mobile device. The stationary wireless devices generally have known pre-determined locations that can be provided to the mobile device 614 via, for example, assistance data communications. In some embodiments, the mobile device may also receive messages (e.g., broadcast messages) from one or more non-stationary wireless devices, such as the wireless device 622 (which may be similarly configured, in its implementation and/or functionality, to any of the wireless devices 112, 122, and/or 132 of FIG. 1), and determine its location or range to one or more of the wireless devices based also on the received messages from the one or more non-stationary wireless devices.

Thus, the system 600 of FIG. 6 provides location or range determination functionality for potentially a large number of users/devices (all of which may be passively receiving the same messages transmitted by the stationary wireless devices depicted in FIG. 6) with a relatively low dedicated extra communication overhead. Because, in the embodiments of FIG. 6, the mobile devices whose location information are to be determined would be generally operating in "listen" mode, the mobile devices would have a low STA power consumption. Additionally, a listening mobile device receiving messages transmitted by multiple stationary wireless devices, with at least one of the multiple stationary wireless devices transmitting broadcast messages that include information (e.g., timing information) pertaining to at least one other message from another stationary mobile device, can have its location determined at an accuracy level on par with that achieved with round-trip time (RTT) implementation (but without the mobile device having to transmit messages, or otherwise interact, with any other wireless device).

In some example embodiments, one stationary wireless device (which may be referred to as the "central," "master," or "super access point") may be configured to send broadcast messages similar to the broadcast messages 220, 222, 224, and 226 of FIG. 2 (i.e., messages that include information pertaining to earlier messages received at an earlier time by the one stationary wireless device), and may also be configured to transmit request messages (e.g., probe messages) to other stationary wireless devices (e.g., AP devices) to cause those other stationary wireless device to send response messages that are received at both the mobile device (at a first time-of-arrival instance) and at the requesting/initiating one stationary wireless device (at a second time-of-arrival instance). The requesting stationary wireless device may subsequently transmit a broadcast message that includes timing information pertaining to the earlier response messages received by the requesting stationary wireless device (e.g., timestamps of the time-of-arrivals of any of the response messages at the requesting stationary wireless devices). When the mobile device receives the subsequently-transmitted broadcast message from the central stationary wireless device (e.g., the super AP), it will have multiple time-of-arrival information for each response message transmitted by the other stationary wireless devices, and will thus be able to derive location information (e.g., derive a location estimate if the mobile device obtained sufficient data points) based on the multiple instances of time-of-arrival information. On the other hand, in some embodiments, use of a super AP to initiate transmission of broadcast messages (e.g., broadcast packets) from other wireless devices/nodes may not be required if the other wireless devices/nodes are already configured for periodic broadcast operations (similar to the functionality of the non-stationary wireless devices of FIGS. 1 and 2). In some embodiments, the super AP may also be configured to facilitate position computation, where mobiles clock drift is related to that of super AP and all APs measurements are related to that of the super AP. It is to be noted that a generalized broadcast scenario, one or more clock drift terms can be used, and one or more APs can be used as a super AP.

In the example of FIG. 6, the stationary wireless device 640a may be configured as a Super-AP (or "Super Base Station") that periodically transmits broadcast messages, such as the broadcast message 650 that may be configured similarly to the broadcast messages 220, 222, 224, and 226 of FIG. 2. The wireless device 640a may also be configured to send broadcast or unicast messages (such as the request message 652) to other stationary wireless devices, such as the stationary wireless device 640b. In response to receiving the request message 652, the wireless device 640b transmits a response message 654 (formatted according to any one of various possible communication protocols) that is received, for example, by the mobile device 614 (as illustrated by a first message instance 654a of the transmitted response) and also by the requesting wireless device 640a (as illustrated by a second message instance 654b of the transmitted response message). The message 654a will be received at the mobile device 614 at a corresponding first ToA instance, while the message 654b will be received at the wireless device 640a at a second ToA instance. As noted, in some embodiments, the broadcast message 654 (represented in FIG. 6 as two message instances 654a and 654b) may have been transmitted as part of scheduled periodic transmissions that the wireless device 640b is configured to perform (i.e., the transmission of the broadcast message 654 was not in response to some received request/probe message). Subsequent to arrival of the response message 654b at the stationary wireless device 640a, the wireless device 640a will generate and transmit a broadcast message, such as the message 650, that include information pertaining to the earlier message 654b that it previously received (at an earlier time). For example, the message 650 may include a timestamp of the second ToA of the message 654b at the wireless device 640a (and may also include other information, such as other ToA information pertaining to other previously received messages, identification data identifying, for example, the source wireless devices that transmitted those earlier received earlier messages, etc.) The mobile device 614 subsequently receives message 650, and obtains therefrom the ToA instance of the message 650 at the mobile device 614. Additionally, the mobile device 614 obtains (e.g., extracts or decodes data encoded on the message 650), among other thing, the ToA of the message 654b at the stationary wireless device 640a.

Figure 7:
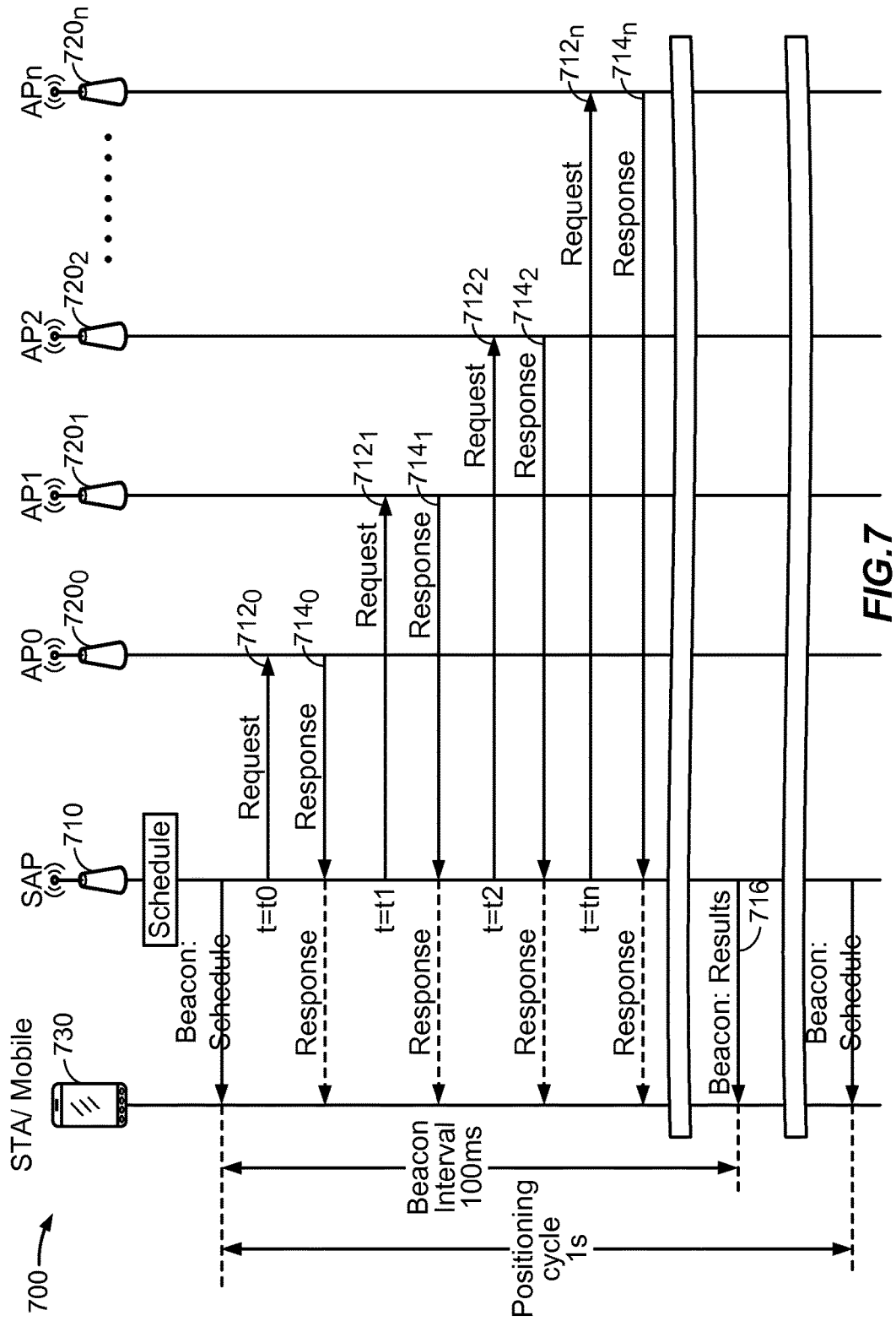
FIG. 7 is a signaling diagram to trigger transmission of broadcast messages.

FIG. 7 is an example signaling diagram illustrating a signaling process 700 in which a super access point 710 transmits individual unicast request messages $712_{0-n}$ to various deployed access points $720_{0-n}$ (i.e., stationary wireless devices) that cause those wireless devices to transmit, in response to receiving the respective individual request messages, respective response messages $714_{0-n}$ that are received by the mobile device 730 (also referred to as device-under-test (DUT), or STA) and by the super AP 710 (as noted, the signaling depicted in FIG. 7 is generally used in embodiments in which the receiving stationary wireless devices are not already configured for periodic broadcasting). Each of the response messages would be received by the super AP 710 and the mobile device 730 at corresponding ToA's. In some embodiments, the response messages $714_{0-n}$ may be transmitted in response to a single request message broadcast by the super/central wireless device to the various stationary wireless devices (i.e., a single broadcast request message triggers response messages from all the AP's receiving the request message). As further shown in FIG. 7, periodically, the super AP 710 (i.e., the AP configured to transmit request messages to other AP's) will generate and transmit a broadcast message (beacon) 716 which may formatted/configured similar to any of the broadcast messages 220, 222, 224, and 226 of FIG. 2 (or any of the other broadcast messages described herein), and that includes information pertaining to one or more of earlier received messages from the AP's (e.g., the response messages $714_{0-n}$ received in response to the request messages $712_{0-n}$, and/or other messages such as messages received at an earlier time period). The broadcast message 716 is received, in the example of FIG. 7, by the mobile device 730, thus providing the mobile device with another set of ToA's (and other pertinent information) for the response messages $714_{0-n}$ that the mobile device 730 separately received, and for which the mobile device 730 determined corresponding ToA's. The mobile device will also be able to determine, from the received broadcast message 716, a time-of-arrival for the message 716.

Turning back to FIG. 6, based on the information obtained by the wireless device 614 (by passively receiving transmissions from transmitting wireless devices), the mobile device 614 can determine location information by deriving and solving, in some embodiments, 'double difference' equations relating the various obtained ToA values. For example, consider an implementation in which a mobile device, such as the mobile device 614 of FIG. 6 or the mobile device 730 of FIG. 7, receives, at time-of-arrival $ToA^i_{mob}$, a message from some stationary wireless device, $AP_i$, that was transmitted from $AP_i$ at time instance $t_i$. As noted, the message from $AP_i$ may have been transmitted in response to a request message from the super access-point (SAP). The SAP also receives the message from $AP_i$ (i.e., the message sent at time $t_i$) at time $ToA^i_{sap}$, and subsequently provides that determined time-of-arrival to the mobile device by transmitting a broadcast message that includes data representative of $ToA^i_{sap}$. Because the clock of the mobile device is generally not synchronized with the clocks at the various AP's, in some embodiments, to mitigate the problem of lack of synchronization between clocks, a reference AP (e.g., $AP_0$) is configured to transmit a reference signal (e.g., periodic reference signal) at a known time $t_0$ (the time being measured with respect to the clock at the SAP). Assume, also, that the time at the mobile device can be modeled (using clock offset and clock drift relative to the clock of the SAP) according to $t_{mob}=(1+\partial)t+\theta$, where t is the time recorded at the SAP, $\partial$ represents the drift effect, and $\theta$ is the offset (higher order models for the drift and offset may be used if higher degree of accuracy is desired). Thus, the following equations to represent the relationship between the ToA's for the signals transmitted from $AP_0$ (the reference AP) and the $AP_i$, and received at the mobile device and at the SAP, are used:

$$ToA^0_{SAP}=t_0+c^{-1}d^0_{SAP}+n^0_{SAP}$$

$$ToA^i_{SAP}=t_i+c^{-1}d^i_{SAP}+n^i_{SAP}$$

$$ToA^0_{mob}=(1+\partial)(t_0+c^{-1}d^0_{mob})+\theta+n^0_{mob}$$

$$ToA^i_{mob}=(1+\partial)(t_i+c^{-1}d^i_{mob})+\theta+n^i_{mob}$$

where d corresponds to the distance between the two devices denoted by the two indices, and n represents a noise term (generally, it is sufficient to use the variance and/or some other statistical properties for the noise term). Thus, the distance can be written as a function of the coordinates of APs and of the mobile device, with the mobile device's coordinates being unknown.

The double difference relationship can thus be defined (in meters) as follows:

$$DD^{meas}(\partial')=c(ToA^i_{SAP}-ToA^0_{SAP})-c(1+\partial')^{-1}(ToA^i_{mob}-ToA^0_{mob}),$$

and the relationship between the measured and the true double difference can be expressed as:

$$DD^{meas}_i(\delta)=(d^i_{SAP}-d^0_{SAP})-(d^i_{mob}-d^0_{mob})+n_i=DD^{true}_i+n_i,$$

Thus, as noted herein, the distance between a mobile device and a stationary wireless device (e.g., an AP) can be expressed as a function of the mobile device's unknown coordinates, which can then be solved using, for example, the double difference equations.

Other processes and techniques for determining the position of a mobile device receiving communications from multiple stationary wireless devices (e.g., multiple AP's) may also be used.

In some embodiments, the relative clock drift (i.e., the relative precision of timing between different devices) of the clocks of two AP devices providing the timing information that is used by the passive mobile device may also need to be estimated to avoid significant positioning errors. In such embodiments, two ways to estimate the relative clock drift may include performing joint parameter estimation (e.g., when also deriving the position of the mobile device) to determine clock drift between two or more AP devices, and/or based on receipt of multiple packets from each AP device for which relative clock drift estimation is required. For example, in some embodiments, when formulating double difference equations, there are four devices, namely, two stationary wireless devices (e.g., two APs), one super-AP, and a mobile device. The clock drifts of the two APs do not appear in the double difference equations, but the clock drift of super-AP with respect to mobile device does appear in the double difference equation. If more than one super-Aps are used, more than one drift term delta ($\Delta$) can be introduced into the system of equations.

Figure 8:
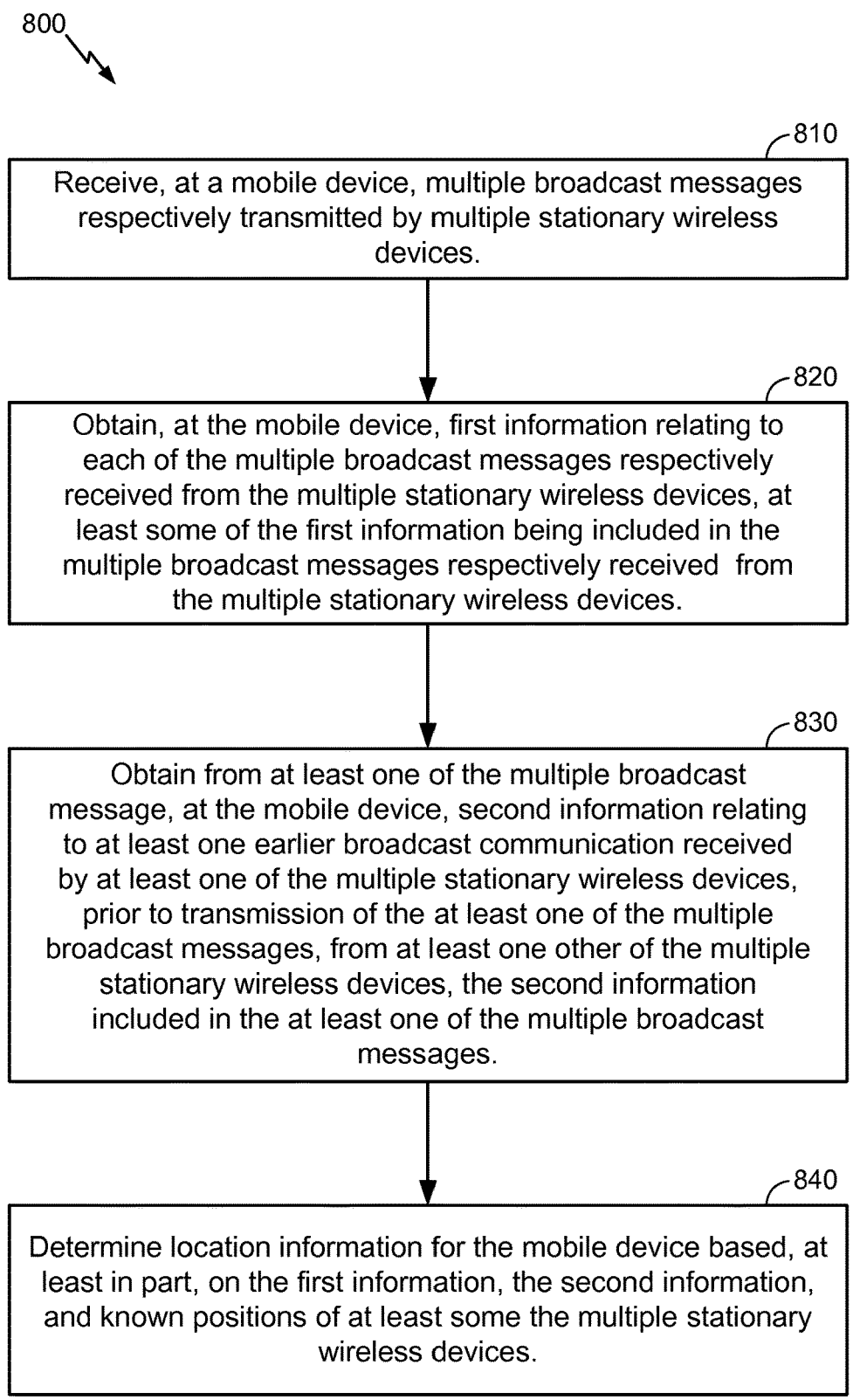
FIG. 8 is a flowchart of an example procedure to determine location information for a mobile device based on information included in broadcast messages from stationary wireless devices.

With reference now to FIG. 8, a flowchart of an example procedure 800 to determine location information for a mobile device (such as the mobile device 614 of FIG. 6) based on broadcast messages from multiple wireless devices (generally, stationary wireless devices) is shown. The procedure 800 may also be used to determine location estimates for the mobile device and/or range estimates between the mobile device and one or more of the multiple stationary wireless devices. Thus, the procedure 800 includes receiving 810, at the mobile device, multiple broadcast messages respectively transmitted by the multiple stationary wireless devices. For example, as illustrated in FIGS. 6 and 7, the broadcast messages may be transmitted from some of the stationary wireless devices (e.g., stationary AP's). These broadcast messages may have been transmitted in response to a request or trigger message transmitted from one of the stationary wireless devices (e.g., the Super AP), such as the AP 640*a* of the system 600. A broadcast message, or a series of unicast messages, may be transmitted to wireless devices, including, for example, any of the stationary AP's 640*b* or 642*a-c*, or even to mobile devices, to cause them to transmit broadcast messages that are received by wireless devices that are within range of the transmitting wireless devices. In some embodiments, the stationary wireless devices transmitting broadcast messages may do so periodically and independently of any request or trigger message from some other wireless device. The broadcast messages transmitted in response to the request or trigger message from the initiating AP may include such information as the identities of transmitting devices, identification of the messages being transmitted, and or timing information (e.g., time-of-departure information, in some implementations). In some embodiments, the broadcasting messages may include one or more of, for example, a beacon frame message configured according to IEEE 802.11 standard, a fine timing measurement (FTM) protocol-based message, a dedicated short-range communication (DSRC) message, and/or any other type of broadcast message that can be received and processed by the particular mobile device that is passively receiving (listening) to these broadcast messages.

Having received the multiple broadcast messages (such messages may be received over some period of time), the mobile device obtains 820 first information relating to each of the multiple broadcast messages respectively received from the multiple stationary wireless devices, with at least some of the first information being included in the multiple broadcast messages respectively received from the multiple stationary wireless devices. The first information may include data that is encoded in the received broadcast messages, such as identification information to identify the transmitting devices and/or to identify the messages themselves (e.g., each message may be identified by some unique identification value). Obtaining such identification information, or any other information included with the received broadcast messages, may thus include performing, via the mobile device's transceivers and processor(s)/controller(s), demodulation, signal processing, and/or decoding operations to extract the information included in the messages. Additionally, in some embodiments, obtaining the first information may also include performing measurements (e.g., timing measurements, signal strength measurements, etc.) on the received broadcast messages. For example, the mobile device (e.g., the device 614 of FIG. 6) will determine and record a time-of-arrival measurement for each of the received broadcast messages.

As further illustrated in FIG. 8, the mobile device also obtains 830 from at least one of the multiple broadcast messages (e.g., the message 650) second information relating to at least one earlier broadcast communication received by at least one of the multiple stationary wireless devices, prior to transmission of the at least one of the multiple broadcast messages, from at least one other of the multiple stationary wireless devices, with the second information included in the at least one of the multiple broadcast messages. For example, the stationary wireless device 640*a* may receive instances of the broadcast messages from the other wireless devices that are transmitting broadcast messages (e.g., transmitting in response to that stationary wireless device's initiating request/trigger message, or transmitting periodical broadcast messages). As shown in FIG. 6, the wireless device 640*a* receives the message 654*b*, which may be an instance/copy of the broadcast message that is also received at the mobile device 614 as the message instance 654*a*. In other words, a wireless device can receive copies of at least some of the same broadcast messages that are (or have been) received by the mobile device 614, and can thus measure/determine corresponding time-of-arrival times for those received messages. That stationary wireless device can subsequently include this time-of-arrival information (and/or other information) in a broadcast message, which may be similar to the broadcast messages 220, 222, 224, or 226 of FIG. 2, that is then transmitted and received by the mobile device 614 as the broadcast message 650 (the message 650, including timing information for the message 654*b*, will generally be received at the mobile device 614 subsequent to receipt, at the device 614 of the message 654*a*). The broadcast message 650, which is configured to include information pertaining to earlier received messages (i.e., received before the message 650 is transmitted) may be configured differently from the broadcast messages transmitted from the other wireless devices (e.g., the message 654*a* may or may not be configured to include data pertaining to earlier received messages).

The second information included in the broadcast message 650 may also include time-of-departure (ToD) for some other previously transmitted broadcast messages (i.e., ToD recorded for an earlier broadcast message by the wireless device transmitting the current broadcast message), and/or identification data to identify the earlier/previous broadcast messages with respect to which at least some timing information is included in the current broadcast message received by the mobile device. As described herein, due to bandwidth constraints, at least some of the information included in the current broadcast message (e.g., information identifying the wireless device 640*a*, and the second information pertaining to at least one earlier message received by the device 640*a*) may include compressed content representative of, for example, the identifying information and the second information pertaining to the at least one earlier received message. The compressed content may include data compressed so that a pre-determined portion of most-significant bits of, for example, the identification information and the second information is removed (or alternatively, that a pre-determined number of the least-significant bits, e.g., 8 bits, 12 bits, etc., of the data included in the at least one broadcast message is kept).

Having obtained the first and the second information from the multiple broadcast messages, the mobile device determines 840 an location information for the mobile device (e.g., a location estimate for the mobile device 614) based, at least in part, on that first and second information, and also based, in some embodiments, on known positions of at least some of the multiple stationary wireless devices. For example, in some embodiments, determining the location of the mobile device may include determining ranges (distances) between the mobile device and the stationary wireless devices (that transmitted broadcast messages), or determining an actual location, that minimizes some error function in which the obtained information is applied. In some embodiments, the error function minimized, and the procedure to perform the minimization, may be similar to the minimization procedure(s) described above in relation to FIGS. 1, 2, and 4. Thus, in such embodiments, the ranges/distances between the mobile device and the wireless device(s) transmitting the broadcast messages may be derived by applying the first information and the second information to, for example, a low-order linear model, a low-order quadratic model, and/or a weighted local linear regression model. In some embodiments, the known locations of the stationary wireless devices may be included in the minimization process to determine not only the ranges (between the mobile device and the stationary wireless device(s) transmitting the broadcast messages), but also the position/location estimate of the mobile device. Alternatively, in some embodiments, determination of the location estimate of the mobile device may be performed by deriving the location estimate based on the determined range estimate and the known positions of the stationary wireless device(s) (i.e., performing a two-prong procedure in which the determination of range estimates and determination of the location estimate are performed as separate steps).

In some embodiments, determination of location information for the mobile device may be performed by deriving double difference relationships in a manner similar to that described herein with respect to FIG. 6. Thus, in such embodiments, the mobile device may receive a first broadcast message (e.g., the message 654a of FIG. 6) from a first wireless device (e.g., the device 640b of FIG. 6), and a second broadcast message (e.g., the message 650) from a second wireless device (e.g., the device 640a), where the first broadcast message is also received at the second wireless device (the message instance 654b), and with the second broadcast message including time-of-arrival information of the first broadcast message at the second wireless device. That is, the ToA for the message 654b at the device 640a is measured, recorded, and included with the broadcast message 650 (as noted, the broadcast message 650 may be configured similarly to any of the broadcast messages 220, 222, 224, or 226 of FIG. 2) so that when the broadcast message 650 is received at the mobile device 614, the mobile device 614 can obtain from the data included within the message 650 the ToA of the message 654b at the device 640a. Additionally, from the received message 654a, the mobile device 614 obtains the ToA for that message. At least some location information for the mobile device 614 can then be determined by deriving double difference relationships based, at least in part, on the time-of-arrival information of the first broadcast message at the second wireless device, and the additional time-of-arrival information for the first broadcast message received at the mobile device. The mobile device may obtain timing information for additional broadcasting messages (which may be transmitted from other wireless devices), as well as obtain, from data included in another broadcast message timing information (e.g., ToA information) for those additional broadcasting messages that were received by another wireless device (transmitting the other broadcast message). Although location determination performed using broadcast messages, as described herein, may require at least two stationary devices to generate a meaningful equation (e.g., double difference) at the mobile device that is passively receiving broadcast messages, multiple such equations may be needed to solve for a position of the mobile device. For example, for a 2D scenario, three stationary devices would be needed to compute the mobile device's position. However, it is to be noted that in situations where some prior knowledge of the mobile device's location exists, a more precise location estimate for the mobile device's position may be obtained based on fewer measurements by, for example, refining an earlier/previous location estimate of the mobile device based on filtering operations.

In some embodiments, more than one wireless device may transmit broadcast messages that include second information (e.g., timing information) pertaining to earlier messages received by those devices, and the mobile device passively receiving those broadcast messages may use some or all of the information included (encoded) in those broadcast messages to derive location information. As also noted, in some embodiments, broadcast messages from various stationary wireless devices may be transmitted independently of a trigger/request message sent by some central/master wireless device (e.g., a super AP). Rather, in such embodiments, those various stationary wireless devices may periodically transmit broadcast messages that may or may not be configured to include information (e.g., timing information, such as time-of-arrival information) pertaining to earlier messages received by them. In some embodiments, location determination may also be facilitated through triangulation-based computations, or through other types of multilateration-based computation procedures.

It is to be noted that, when the mobile device performs processes to determine its location (e.g., based on information relating to, or included in, broadcast messages from stationary wireless devices), the mobile device may have previously received and stored assistance data (e.g., from a remote server, such as the server 150 of FIG. 1, or from at least one of the multiple stationary wireless devices transmitting the broadcast messages) that includes the known locations of the stationary wireless devices. As also discussed in relation to FIGS. 1 and 2, in some embodiments, the procedure 800 may include adjusting one or more of the first information and the second information to account for relative clock drift between a first clock associated with a first one of the multiple stationary wireless devices and a second clock of a second one of the multiple stationary wireless devices.

Figure 9:
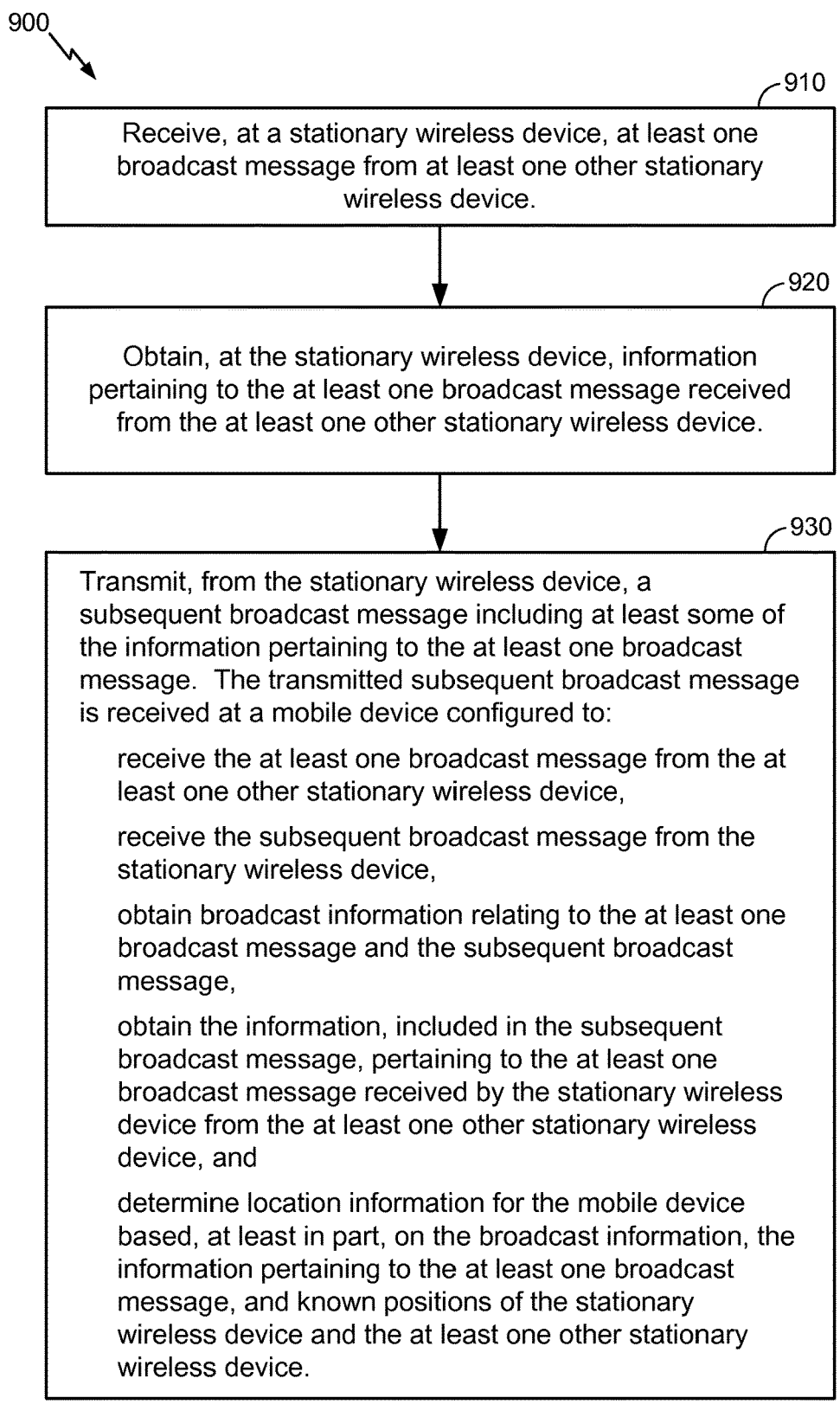
FIG. 9 is a flowchart of an example procedure, generally performed at a stationary wireless device, to facilitate determination of location information for a mobile device.

With reference now to FIG. 9, a flowchart of an example procedure 900, generally performed at a stationary wireless device (e.g., a first, central/super wireless device, similar to, for example, the devices 640a and 710 of FIGS. 6 and 7), is shown. The example procedure 900 facilitates determining location information (including a location estimate) for a mobile device passively receiving broadcast messages from multiple stationary wireless devices. As shown, the example procedure includes receiving 910, at the stationary wireless device, at least one broadcast message (e.g., such as the broadcast message 654b depicted in FIG. 6) from at least one other, second, stationary wireless device (such as the stationary wireless device 640b of FIG. 6). As noted, in some embodiments, the at least one broadcast message may have been transmitted by the at least one other stationary wireless device in response to an initiating request/trigger message (such as the message 652 shown in FIG. 6) transmitted by the stationary wireless device. Such an initiating request/trigger message may be a unicast or a broadcast message. As also noted, in some embodiments, the at least one broadcast message may have been transmitted by the at least one other stationary wireless device in the course of that stationary wireless device's periodic transmission of broadcast messages (i.e., independently of, and not in response to, any triggering/request messages sent by some other device).

Having received the broadcast message from the at least one other stationary wireless device, the stationary wireless device obtains 920 information pertaining to the at least one broadcast message received from the at least one other stationary wireless device. For example, the time-of-arrival for the received at least one broadcast message may be measured/determined, and identification information relating to the at least one broadcast message (for example, identification of the at least one other stationary wireless device that transmitted that broadcast message, identification of the actual at least one broadcast message, e.g., packet ID, etc.) is obtained (decoded or extracted) from the at least one broadcast message.

Subsequently, the stationary wireless device transmits 930 a subsequent broadcast message including at least some of the information pertaining to the at least one broadcast message. For example, the stationary wireless device generates the subsequent broadcast message (which may be a packet-type message, or any other type of communication) that includes (e.g., encoded in the message) such information, pertaining to the previously received at least one broadcast message, as the time-of-arrival of the at least one broadcast message at the stationary wireless device, some or all of the identification information associated with the received at least one broadcast message, etc. In some embodiments, the subsequent broadcast message may include information pertaining to several earlier broadcast messages received at the stationary wireless device, and may also include further information that was included in one or more of those broadcast messages (by the devices transmitting those one or more broadcast messages), with that further information pertaining to additional broadcast messages that were received earlier by the devices transmitting the one or more broadcast message. In some embodiments, transmitting the subsequent broadcast message may include transmitting the subsequent broadcast message with compressed data for the at least some of the information pertaining to the at least one broadcast message.

The subsequent broadcast message transmitted by the stationary wireless device is received at a mobile device that is configured to receive the at least one broadcast message (i.e., receive a copy/instance of the at least one broadcast message transmitted by the at least one other stationary wireless device, and then also received by the first stationary wireless device), and to receive the subsequent broadcast message from the stationary wireless device (i.e., the first stationary wireless device of FIG. 9). The mobile device is also configured to obtain broadcast information relating to the at least one broadcast message and the subsequent broadcast message, obtain the information included in the subsequent broadcast message pertaining to the at least one broadcast message received by the stationary wireless device from the at least one other stationary wireless device, and determine location information for the mobile device based, at least in part, on the broadcast information, the information pertaining to the at least one broadcast message, and known positions of the stationary wireless device and the at least one other stationary wireless device.

Additional Implementations

Figure 10:
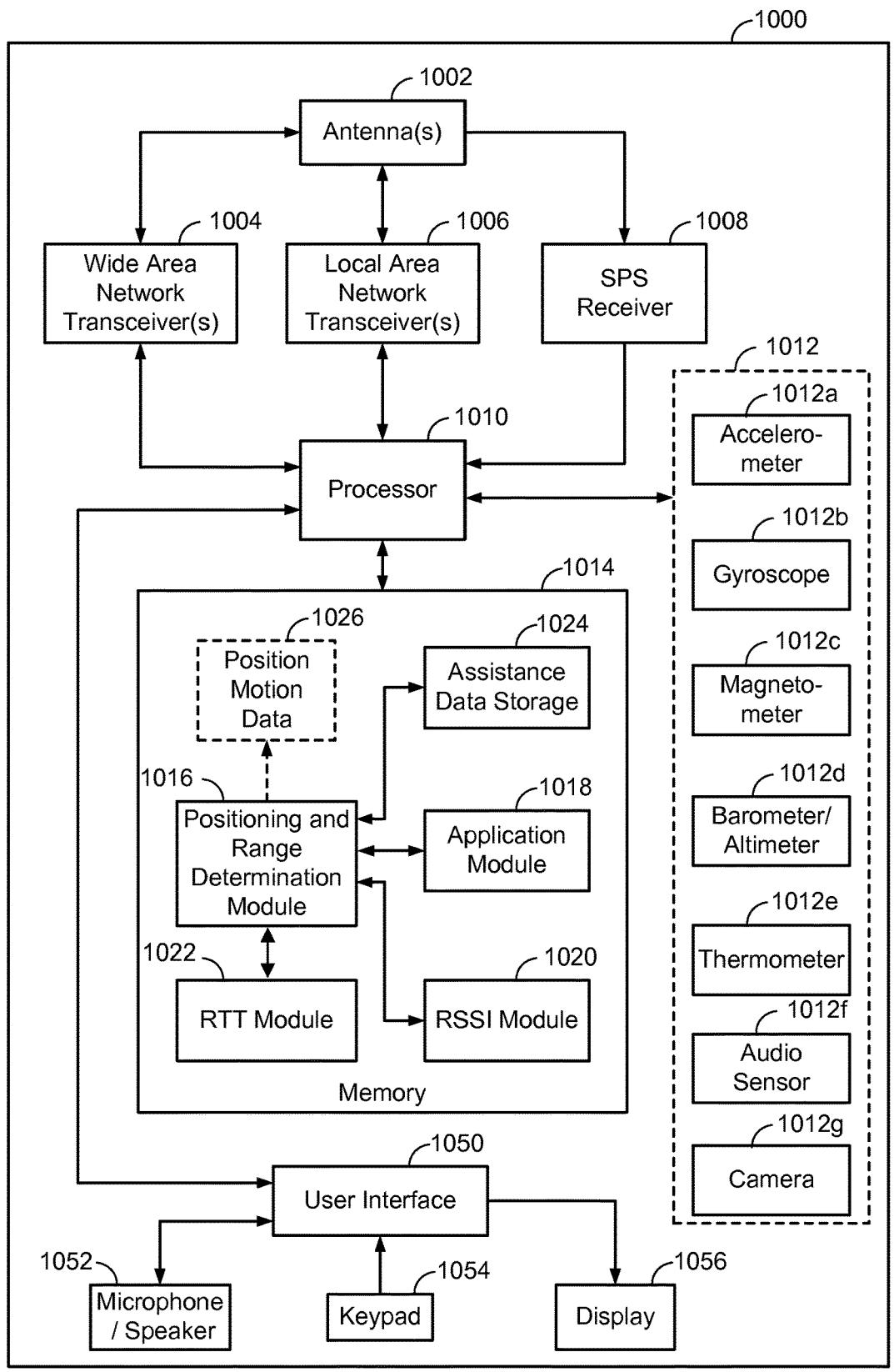
FIG. 10 is a schematic diagram illustrating various components of an example wireless device.

With reference to FIG. 10, a schematic diagram illustrating various components of an example wireless device 1000, which may be, at least partly, similar to (in implementation and/or functionality) any of the wireless devices 112, 114, 122, 132, 202, 204, 500, 512, 614, 622, and/or 730 of FIGS. 1, 2, 5, 6, and/or 7 is shown. In some embodiments, the example device 1000 may also be used, at least part, in the implementation of any of the devices 140, 142, 150, 640a-b, 642a-c, 710, and/or 720$_{0-n}$ depicted in FIGS. 1 and 6. For the sake of simplicity, the various features/components/functions illustrated in the schematic boxes of FIG. 10 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 10 may be further subdivided, or two or more of the features or functions illustrated in FIG. 10 may be combined. Additionally, one or more of the features or functions illustrated in FIG. 10 may be excluded.

As shown, the mobile device 1000 may include one or more local area network transceivers 1006 that may be connected to one or more antennas 1002. The one or more local area network transceivers 1006 comprise suitable devices, circuits, hardware, and/or software for communicating with and/or detecting signals to/from one or more of the WLAN access points 112, 114, 122, 132, and/or 142 depicted in FIG. 1, the WLAN access points 622, and/or 642a-c of FIG. 6, and/or directly with other wireless devices within a network. In some embodiments, the local area network transceiver(s) 1006 may comprise a WiFi (802.11x) communication transceiver suitable for communicating with one or more wireless access points; however, in some embodiments, the local area network transceiver(s) 1006 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The mobile device 1000 may also include, in some implementations, one or more wide area network transceiver(s) 1004 that may be connected to the one or more antennas 1002. The wide area network transceiver 1004 may comprise suitable devices, circuits, hardware, and/or software for communicating with and/or detecting signals from one or more of, for example, the WWAN wireless devices illustrated in FIGS. 1 and 6. In some implementations, the wide area network transceiver(s) 1004 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax (802.16), etc.

In some embodiments (such as in the cases of the mobile device 114 of FIG. 1, the device 614 of FIG. 6, or the device 730 of FIG. 7), an SPS receiver (also referred to as a global navigation satellite system (GNSS) receiver) 1008 may also be included with the mobile device 1000. The SPS receiver 1008 may be connected to the one or more antennas 1002 for receiving satellite signals. The SPS receiver 1008 may comprise any suitable hardware and/or software for receiving and processing SPS signals. The SPS receiver 1008 may request information as appropriate from the other systems, and may perform the computations necessary to determine the position of the mobile device 1000 using, in part, measurements obtained by any suitable SPS procedure.

As further illustrated in FIG. 10, the example device 1000 includes one or more sensors 1012 coupled to a processor/controller 1010. For example, the sensors 1012 may include motion sensors to provide relative movement and/or orientation information (which is independent of motion data derived from signals received by the wide area network transceiver(s) 1004, the local area network transceiver(s) 1006, and/or the SPS receiver 1008). By way of example but not limitation, the motion sensors may include an accelerometer 1012a, a gyroscope 1012b, and a geomagnetic (magnetometer) sensor 1012c (e.g., a compass), any of which may be implemented based on micro-electro-mechanical-system (MEMS), or based on some other technology. The one or more sensors 1012 may further include an altimeter (e.g., a barometric pressure altimeter) 1012*d*, a thermometer (e.g., a thermistor) 1012*e*, an audio sensor 1012*f* (e.g., a microphone) and/or other sensors. As further shown in FIG. 10, in some embodiments, the one or more sensors 1012 may also include a camera 1012*g* (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 1010 may be connected to the local area network transceiver(s) 1006, the wide area network transceiver(s) 1004, the SPS receiver 1008 the antennas 1002 and the one or more sensors 1012. The processor may include one or more microprocessors, microcontrollers, and/or digital signal processors that provide processing functions, as well as other calculation and control functionality. The processor 1010 may be coupled to storage media (e.g., memory) 1014 for storing data and software instructions for executing programmed functionality within the mobile device. The memory 1014 may be on-board the processor 1010 (e.g., within the same IC package), and/or the memory may be external memory to the processor and functionally coupled over a data bus. Further details regarding an example embodiment of a processor or computation system, which may be similar to the processor 1010, are provided below in relation to FIG. 11.

A number of software modules and data tables may reside in memory 1014 and may be utilized by the processor 1010 in order to manage both communications with remote devices/nodes (such as the various wireless devices/nodes and/or the server depicted in FIGS. 1, 2, 6, and 7), perform positioning determination functionality (e.g., when the device 1000 is used in the implementation of a mobile device such as the devices 114, 614, or 730 of FIGS. 1, 6, and 7, respectively), and/or perform device control functionality. As illustrated in FIG. 10, in some embodiments, the memory 1014 may include a positioning and range determination module 1016, an application module 1018, a received signal strength indicator (RSSI) module 1020, and/or a round trip time (RTT) module 1022. It is to be noted that the functionality of the modules and/or data structures may be combined, separated, and/or be structured in different ways depending upon the implementation of the mobile device 1000. For example, the RSSI module 1020 and/or the RTT module 1022 may each be realized, at least partially, as a hardware-based implementation, and may thus include such devices or circuits as a dedicated antenna (e.g., a dedicated RTT and/or an RSSI antenna), a dedicated processing unit to process and analyze signals received and/or transmitted via the antenna(s) (e.g., to determine signal strength of received signals, determine timing information in relation to an RTT cycle, etc.)

The application module 1018 may be a process running on the processor 1010 of the mobile device 1000, which requests position and/or range information from the positioning and range determination module 1016. Applications typically run within an upper layer of the software architectures, and may include navigation applications, shopping applications, location aware service applications, etc. For example, when used to determine ranges between the device 1000 and other wireless devices in its vicinity (e.g., other wireless devices installed in near-by vehicles), the application module 1018 may include an application to display information about the proximity of other vehicles to the vehicle in which the device 1000 is installed, and to raise an alarm if it appears that another vehicle (that includes an installed wireless device broadcasting messages from which range information may be derived) is too close to the mobile device 1000.

The positioning and range determination module 1016 may determine location information for the mobile device 1000 using information derived from various receivers and modules of the mobile device 1000. In some embodiments (e.g., such as those described in relation to FIGS. 1 and 4), the module 1016 may be configured to determine range to other wireless devices based, in part, on information (e.g., timing information and identification information) obtained by the device 1000 for broadcast messages the device 1000 periodically transmits, and for periodic broadcast messages the device receives from other wireless devices. In some embodiments (e.g., such as those described in relation to FIGS. 6-9), the module 1016 may be configured to determine location information (e.g., determine an approximate location) based on broadcast messages from multiple stationary wireless devices used for obtaining information (e.g., timing information, such as ToA information).

As further illustrated, the mobile device 1000 may also include assistance data storage 1024, where assistance data (which may have been downloaded from a remote server), such as map information, data records relating to location information in an area where the device is currently located, known locations of stationary wireless devices, etc., is stored. In some embodiments, the mobile device 1000 may also be configured to receive supplemental information that includes auxiliary position and/or motion data which may be determined from other sources (e.g., from the one or more sensors 1012). Such auxiliary position data may be incomplete or noisy, but may be useful as another source of independent information for estimating the position of the device 1000, or for performing other operations or functions. Supplemental information may also include, but not be limited to, information that can be derived or based upon Bluetooth signals, beacons, RFID tags, and/or information derived from a map (e.g., receiving coordinates from a digital representation of a geographical map by, for example, a user interacting with a digital map). The supplemental information may optionally be stored in a storage module 1026 schematically depicted in FIG. 10.

The mobile device 1000 may further include a user interface 1050 providing suitable interface systems, such as a microphone/speaker 1052, a keypad 1054, and a display 1056 that allows user interaction with the mobile device 1000. The microphone/speaker 1052 (which may be the same or different from the sensor 1012*f*) provides for voice communication services (e.g., using the wide area network transceiver(s) 1004 and/or the local area network transceiver(s) 1006). The keypad 1054 may comprise suitable buttons for user input. The display 1056 may include a suitable display, such as, for example, a backlit LCD display, and may further include a touch screen display for additional user input modes.

Figure 11:
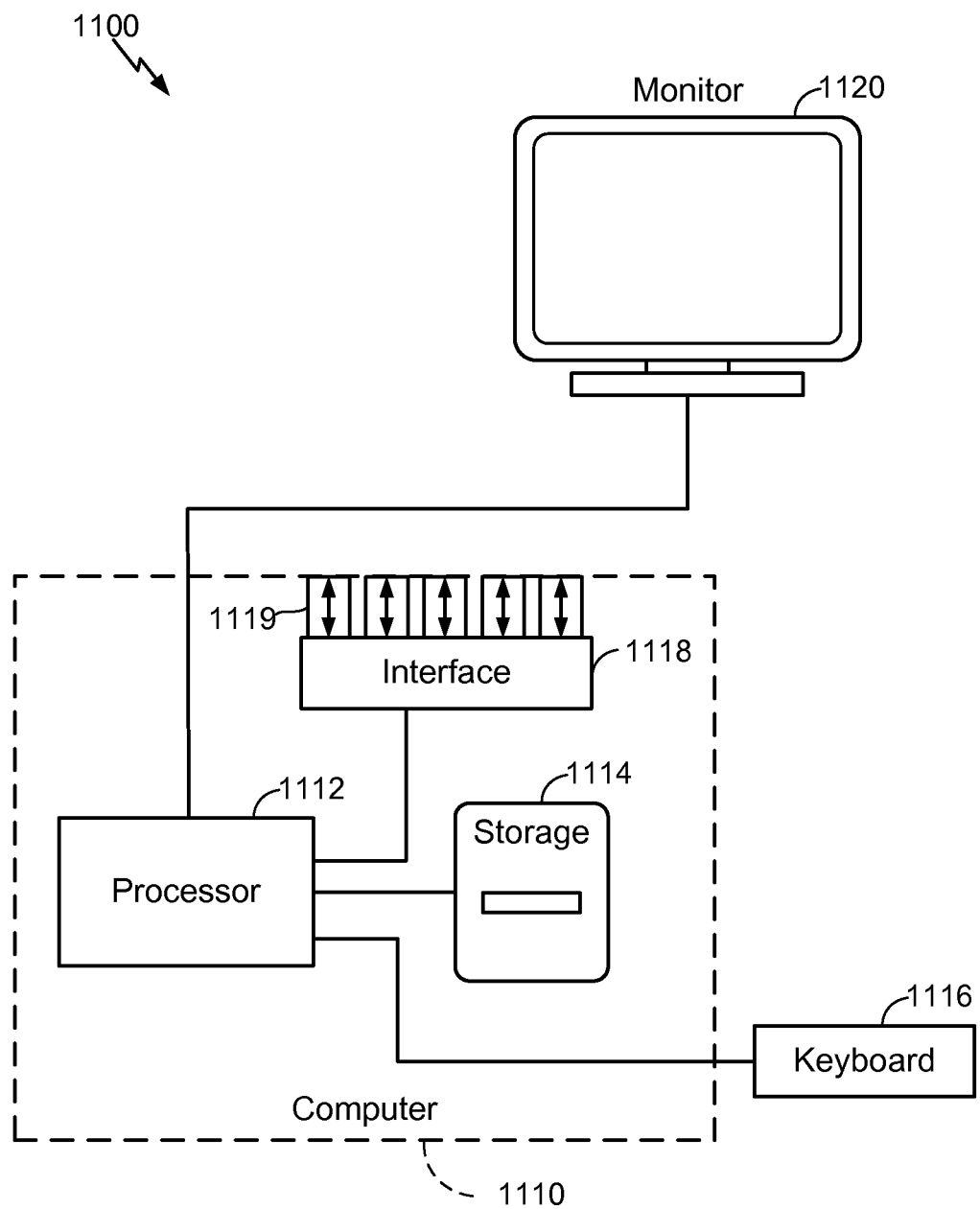
FIG. 11 is a schematic diagram of an example computing system.

Performing the procedures described herein may also be facilitated by a processor-based computing system. With reference to FIG. 11, a schematic diagram of an example computing system 1100 is shown. The computing system 1100 may be housed in, for example, a wireless device such as the devices 112, 114, 122, 132, 202, 204, 614, 622, 730, and 1000 of FIGS. 1, 2, 6, 7, and 10, and/or may comprise at least part of, or all of, servers, nodes, access points, or base stations, such as the nodes 140, 142, 150, 640*a-b*, 642*a-c*, 710, 720$_{0-n}$ and/or 1000 depicted in FIGS. 1, 6, 7, and 10. The computing system 1100 includes a computing-based device 1110 such as a personal computer, a specialized computing device, a controller, and so forth, that typically includes a central processor unit (CPU) 1112. In addition to the CPU 1112, the system includes main memory, cache memory and bus interface circuits (not shown). The computing-based device 1110 may include a mass storage device 1114, such as a hard drive and/or a flash drive associated with the computer system. The computing system 1100 may further include a keyboard, or keypad, 1116, and a monitor 1120, e.g., a CRT (cathode ray tube) or LCD (liquid crystal display) monitor, that may be placed where a user can access them (e.g., a mobile device's screen).

The computing-based device 1110 is configured to facilitate, for example, the implementation of one or more of the procedures described herein (including the procedures to obtain information related to broadcast messages, determine location information (such as ranges) between devices transmitting broadcast messages, determine location information for devices based on broadcast messages passively received from stationary wireless devices transmitting such broadcast messages, etc.) The mass storage device 1114 may thus include a computer program product that, when executed on the computing-based device 1110, causes the computing-based device to perform operations to facilitate the implementation of the procedures described herein. The computing-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 11, the computing-based device 1110 may include an interface 1118 with one or more interfacing circuits (e.g., a wireless port that include transceiver circuitry, a network port with circuitry to interface with one or more network device, etc.) to provide/implement communication with remote devices (e.g., so that a wireless device, such as any of the wireless devices 112 or 114 of FIG. 1, or any other wireless device depicted in any of the figures, could communicate, via a port such as the port 1119, with another wireless device). Alternatively and/or additionally, in some embodiments, special purpose logic circuitry, e.g., an FPGA (field programmable gate array), a DSP processor, an ASIC (application-specific integrated circuit), or other types of circuit-based and hardware arrangements may be used in the implementation of the computing system 1100. Other modules that may be included with the computing-based device 1110 are speakers, a sound card, a pointing device, e.g., a mouse or a trackball, by which the user can provide input to the computing system 1100. The computing-based device 1110 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1110 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

Further Subject Matter/Embodiments of Interest

The following recitation is drawn to additional subject matter that may be of interest and which is also described in detail herein along with subject matter presented in the initial claims presently presented herein:

A1—A method comprising: receiving, at a wireless device, at least one broadcast message from at least one other wireless device; obtaining, at the wireless device, information pertaining to the at least one broadcast message received from the at least one other wireless device; and transmitting, from the wireless device, a subsequent broadcast message including at least some of the information pertaining to the at least one broadcast message; wherein the transmitted subsequent broadcast message is received at a mobile device configured to: receive the at least one broadcast message from the from at least one other wireless device; receive the subsequent broadcast message from the wireless device; obtain broadcast information relating to the at least one broadcast message and the subsequent broadcast message; obtain the information, included in the subsequent broadcast message, pertaining to the at least one broadcast message received by the wireless device from the at least one other wireless device; and determine location information for the mobile device based, at least in part, on the broadcast information, the information pertaining to the at least one broadcast message, and known positions of the wireless device and the at least one other wireless device.

A2—The method recited in subject matter example A1, wherein the broadcast information comprises at least a first time-of-arrival, at the mobile device, for the at least one broadcast message, and wherein the information pertaining to the at least one broadcast message comprises at least a second time-of-arrival, at the wireless device, for the at least one broadcast message.

A3—The method recited in subject matter example A1, further comprising: transmitting a request message to the at least one other wireless device to cause the at least one other wireless device to transmit the at least one broadcast message.

A4—The method recited in subject matter example A3, wherein transmitting the request message comprises one of: transmitting a unicast request message to the at least one other wireless device, or transmitting a broadcast message to multiple wireless devices including the at least one other wireless device.

A5—The method recited in subject matter example A1, wherein transmitting, from the wireless device, the subsequent broadcast message including the at least some of the information pertaining to the at least one broadcast message comprises: transmitting the subsequent broadcast message including compressed data for the at least some of the information pertaining to the at least one broadcast message.

B1—A wireless device comprising: a transceiver configured to receive at least one broadcast message from at least one other wireless device; and one or more processors, coupled to the transceiver, configured to obtain, at the wireless device, information pertaining to the at least one broadcast message received from the at least one other wireless device; wherein the transceiver is further configured to transmit, from the wireless device, a subsequent broadcast message including at least some of the information pertaining to the at least one broadcast message; and wherein the transmitted subsequent broadcast message is received at a mobile device configured to: receive the at least one broadcast message from the from at least one other wireless device; receive the subsequent broadcast message from the wireless device; obtain broadcast information relating to the at least one broadcast message and the subsequent broadcast message; obtain the information, included in the subsequent broadcast message, pertaining to the at least one broadcast message received by the wireless device from the at least one other wireless device; and determine location information for the mobile device based, at least in part, on the broadcast information, the information pertaining to the at least one broadcast message, and known positions of the wireless device and the at least one other wireless device.

C1—An apparatus comprising means for receiving, at a wireless device, at least one broadcast message from at least one other wireless device; means for obtaining, at the wireless device, information pertaining to the at least one broadcast message received from the at least one other wireless device; and means for transmitting, from the wireless device, a subsequent broadcast message including at least some of the information pertaining to the at least one broadcast message; wherein the transmitted subsequent broadcast message is received at a mobile device configured to: receive the at least one broadcast message from the from at least one other wireless device; receive the subsequent broadcast message from the wireless device; obtain broadcast information relating to the at least one broadcast message and the subsequent broadcast message; obtain the information, included in the subsequent broadcast message, pertaining to the at least one broadcast message received by the wireless device from the at least one other wireless device; and determine location information for the mobile device based, at least in part, on the broadcast information, the information pertaining to the at least one broadcast message, and known positions of the wireless device and the at least one other wireless device.

D1—A non-transitory computer readable media programmed with instructions, executable on a processor, to: receive, at a wireless device, at least one broadcast message from at least one other wireless device; obtain, at the wireless device, information pertaining to the at least one broadcast message received from the at least one other wireless device; and transmit, from the wireless device, a subsequent broadcast message including at least some of the information pertaining to the at least one broadcast message; wherein the transmitted subsequent broadcast message is received at a mobile device configured to: receive the at least one broadcast message from the from at least one other wireless device; receive the subsequent broadcast message from the wireless device; obtain broadcast information relating to the at least one broadcast message and the subsequent broadcast message; obtain the information, included in the subsequent broadcast message, pertaining to the at least one broadcast message received by the wireless device from the at least one other wireless device; and determine location information for the mobile device based, at least in part, on the broadcast information, the information pertaining to the at least one broadcast message, and known positions of the wireless device and the at least one other wireless device.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method of estimating a location of a mobile device, the method comprising:

receiving, at the mobile device, multiple broadcast messages respectively transmitted by multiple stationary wireless devices;

obtaining, at the mobile device, first information relating to each of the multiple broadcast messages respectively received from the multiple stationary wireless devices, at least some of the first information being included in the multiple broadcast messages respectively received from the multiple stationary wireless devices;

obtaining from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, the second information included in the at least one of the multiple broadcast messages;

adjusting, based on timing measurements, measured at the mobile device, of broadcast messages between a first one of the multiple stationary wireless devices and a second one of the multiple stationary wireless devices, one or more of the first information and the second information to account for relative clock drift between a first clock associated with the first one of the multiple stationary wireless devices and a second clock associated with the second one of the multiple stationary wireless devices based on a known time of transmission of a reference signal from a reference stationary wireless device; and determining location information for the mobile device based, at least in part, on the first information, the second information, and known positions of at least some of the multiple stationary wireless devices.

2. The method of claim 1, wherein the second information relating to the at least one earlier broadcast communication comprises: timing information for the at least one earlier broadcast communication, device identification data to identify the at least one other of the multiple stationary wireless devices from which the at least one earlier broadcast communication was transmitted, or message identification data to identify the at least one earlier broadcast communication, or any combination thereof.

3. The method of claim 1, wherein the at least one of the earlier broadcast communication received by the at least one of the multiple stationary wireless devices corresponds to one of the multiple broadcast messages received by the mobile device.

4. The method of claim 1, wherein the second information and the at least some of the first information comprise timestamp data corresponding to one or more of: at least one of the multiple broadcast messages, or the at least one earlier broadcast communication received by the at least one of the multiple stationary wireless devices prior to the transmission of the at least one of the multiple broadcast messages.

5. The method of claim 1, wherein the multiple broadcast messages each comprises: a beacon frame message configured according to IEEE 802.11 standard, a fine timing measurement (FTM) protocol-based message, a dedicated short-range communication (DSRC) message, or any combination thereof.

6. The method of claim 1, wherein the second information included in the at least one of the multiple broadcast messages and a portion of the first information relating to the at least one of the multiple broadcast messages comprise compressed content representative of the second information and the portion of the first information relating to the at least one of the multiple broadcast messages.

7. The method of claim 6, wherein the compressed content representative of the second information and the portion of the first information comprises data compressed so that a pre-determined portion of most-significant bits of the second information included in the at least one of the multiple broadcast messages, and the portion of the first information, is removed.

8. The method of claim 1, wherein the first information comprises identification information for the multiple stationary wireless devices.

9. The method of claim 1, wherein determining the location information of the mobile device based on the first information, the second information, and the known positions of the at least some of the multiple stationary wireless devices comprises:

deriving an estimated position of the mobile device by applying the first information and the second information to:
a low-order, linear model;
a low-order, quadratic model; or
a weighted local linear regression;
or any combination thereof.

10. The method of claim 1, wherein obtaining the first information and obtaining the second information comprises:

receiving at the mobile device a first broadcast message from a first wireless device, and a second broadcast message from a second wireless device, wherein the first broadcast message is also received at the second wireless device, and wherein the second broadcast message includes time-of-arrival information of the first broadcast message at the second wireless device; and obtaining at the mobile device additional time-of-arrival information for the first broadcast message received at the mobile device;

and wherein determining the location information of the mobile device comprises:

solving a function of a distance between the mobile device and at least one of the stationary wireless devices for coordinates of the mobile device using double difference relationships based, at least in part, on the time-of-arrival information of the first broadcast message at the second wireless device, and the additional time-of-arrival information for the first broadcast message received at the mobile device.

11. The method of claim 1, further comprising:
receiving data representative of the known positions of the at least some of the multiple stationary wireless devices.

12. The method of claim 1, wherein the at least one earlier broadcast communication is one of periodically transmitted broadcast messages from the at least one other of the multiple stationary wireless devices.

13. The method of claim 1, wherein the at least one earlier broadcast communication is transmitted by the at least one other of the multiple stationary wireless devices in response to a request message initially sent by the at least one of the multiple stationary wireless devices.

14. A mobile device comprising:
a transceiver configured to:
receive multiple broadcast messages respectively transmitted by multiple stationary wireless devices;
one or more processors, coupled to the transceiver, configured to:
obtain first information relating to each of the multiple broadcast messages respectively received from the multiple stationary wireless devices, at least some of the first information being included in the multiple broadcast messages respectively received from the multiple stationary wireless devices;
obtain from at least one of the multiple broadcast messages second information relating to at least one earlier broadcast communication received by at least one of the multiple stationary wireless devices, prior to transmission of the at least one of the multiple broadcast messages, from at least one other of the multiple stationary wireless devices, the second information included in the at least one of the multiple broadcast messages;
adjust, based on timing measurements, measured at the mobile device, of broadcast messages between a first one of the multiple stationary wireless devices and a second one of the multiple stationary wireless devices, one or more of the first information and the second information to account for relative clock drift between a first clock associated with the first one of the multiple stationary wireless devices and a second clock associated with the second one of the multiple stationary wireless devices based on a known time of transmission of a reference signal from a reference stationary wireless device; and
determine location information for the mobile device based, at least in part, on the first information, the second information, and known positions of at least some of the multiple stationary wireless devices.

15. The mobile device of claim 14, wherein the second information relating to the at least one earlier broadcast communication comprises: timing information for the at least one earlier broadcast communication, device identification data to identify the at least one other of the multiple stationary wireless devices from which the at least one earlier broadcast communication was transmitted, or message identification data to identify the at least one earlier broadcast communication, or any combination thereof.

16. The mobile device of claim 14, wherein the at least one of the earlier broadcast communication received by the at least one of the multiple stationary wireless devices corresponds to one of the multiple broadcast messages received by the mobile device.

17. The mobile device of claim 14, wherein the second information and the at least some of the first information comprise timestamp data corresponding to one or more of: at least one of the multiple broadcast messages, or the at least one earlier broadcast communication received by the at least one of the multiple stationary wireless devices prior to the transmission of the at least one of the multiple broadcast messages.

18. The mobile device of claim 14, wherein the second information included in the at least one of the multiple broadcast messages and a portion of the first information relating to the at least one of the multiple broadcast messages comprise compressed content representative of the second information and the portion of the first information relating to the at least one of the multiple broadcast messages.

19. The mobile device of claim 18, wherein the compressed content representative of the second information and the portion of the first information comprises data compressed so that a pre-determined portion of most-significant bits of the second information included in the at least one of the multiple broadcast messages, and the portion of the first information, is removed.

20. The mobile device of claim 14, wherein the first information comprises identification information for the multiple stationary wireless devices.

21. The mobile device of claim 14, wherein the transceiver configured to receive the multiple broadcast messages is configured to receive a first broadcast message from a first wireless device, and a second broadcast message from a second wireless device, wherein the first broadcast message is also received at the second wireless device, and wherein the second broadcast message includes time-of-arrival information of the first broadcast message at the second wireless device;
wherein the one or more processors configured to obtain the first information and the second information are configured to obtain additional time-of-arrival information for the first broadcast message received at the mobile device;
and wherein the one or more processors configured to determine the location information of the mobile device are configured to solve a function of a distance between the mobile device and at least one of the stationary wireless devices for coordinates of the mobile device using double difference relationships based, at least in part, on the time-of-arrival information of the first broadcast message at the second wireless device, and the additional time-of-arrival information for the first broadcast message received at the mobile device.

22. The mobile device of claim 14, wherein the transceiver is further configured to:
receive data representative of the known positions of the at least some of the multiple stationary wireless devices.

23. An apparatus comprising:
means for receiving, at a mobile device, multiple broadcast messages respectively transmitted by multiple stationary wireless devices;
means for obtaining, at the mobile device, first information relating to each of the multiple broadcast messages respectively received from the multiple stationary wireless devices, at least some of the first information being included in the multiple broadcast messages respectively received from the multiple stationary wireless devices;

means for obtaining from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, the second information included in the at least one of the multiple broadcast messages;

means for adjusting, based on timing measurements, measured at the mobile device, of broadcast messages between a first one of the multiple stationary wireless devices and a second one of the multiple stationary wireless devices, one or more of the first information and the second information to account for relative clock drift between a first clock associated with the first one of the multiple stationary wireless devices and a second clock associated with the second one of the multiple stationary wireless devices based on a known time of transmission of a reference signal from a reference stationary wireless device; and means for determining location information for the mobile device based, at least in part, on the first information, the second information, and known positions of at least some of the multiple stationary wireless devices.

24. The apparatus of claim 23, wherein the second information relating to the at least one earlier broadcast communication comprises: timing information for the at least one earlier broadcast communication, device identification data to identify the at least one other of the multiple stationary wireless devices from which the at least one earlier broadcast communication was transmitted, or message identification data to identify the at least one earlier broadcast communication, or any combination thereof.

25. The apparatus of claim 23, wherein the means for obtaining the first information and the means for obtaining the second information comprise:

means for receiving at the mobile device a first broadcast message from a first wireless device, and a second broadcast message from a second wireless device, wherein the first broadcast message is also received at the second wireless device, and wherein the second broadcast message includes time-of-arrival information of the first broadcast message at the second wireless device; and means for obtaining at the mobile device additional time-of-arrival information for the first broadcast message received at the mobile device;

and wherein the means for determining the location information of the mobile device comprises:

means for solving a function of a distance between the mobile device and at least one of the stationary wireless devices for coordinates of the mobile device using double difference relationships based, at least in part, on the time-of-arrival information of the first broadcast message at the second wireless device, and the additional time-of-arrival information for the first broadcast message received at the mobile device.

26. The apparatus of claim 23, further comprising:

means for receiving data representative of the known positions of the at least some of the multiple stationary wireless devices.

27. A non-transitory computer readable media programmed with instructions, executable on a processor, to:

receive, at a mobile device, multiple broadcast messages respectively transmitted by multiple stationary wireless devices;

obtain, at the mobile device, first information relating to each of the multiple broadcast messages respectively received from the multiple stationary wireless devices, at least some of the first information being included in the multiple broadcast messages respectively received from the multiple stationary wireless devices;

obtain from at least one of the multiple broadcast messages, at the mobile device, second information relating to at least one earlier broadcast communication received by at least one of the multiple stationary wireless devices, prior to transmission of the at least one of the multiple broadcast messages, from at least one other of the multiple stationary wireless devices, the second information included in the at least one of the multiple broadcast messages;

adjust, based on timing measurements, measured at the mobile device, of broadcast messages between a first one of the multiple stationary wireless devices and a second one of the multiple stationary wireless devices, one or more of the first information and the second information to account for relative clock drift between a first clock associated with the first one of the multiple stationary wireless devices and a second clock associated with the second one of the multiple stationary wireless devices based on a known time of transmission of a reference signal from a reference stationary wireless device; and determine location information for the mobile device based, at least in part, on the first information, the second information, and known positions of at least some of the multiple stationary wireless devices.

28. The computer readable media of claim 27, wherein the second information relating to the at least one earlier broadcast communication comprises: timing information for the at least one earlier broadcast communication, device identification data to identify the at least one other of the multiple stationary wireless devices from which the at least one earlier broadcast communication was transmitted, or message identification data to identify the at least one earlier broadcast communication, or any combination thereof.

29. The method of claim 1, further comprising obtaining an indication of the known time of transmission of the reference signal from a reference clock of the reference stationary wireless device.

* * * * *